United States Patent
Sharma et al.

(10) Patent No.: US 9,602,405 B1
(45) Date of Patent: Mar. 21, 2017

(54) SYSTEMS, METHODS, AND APPARATUS FOR IMPLEMENTING AGENTS IN SERVICE APPLIANCES

(71) Applicant: CISCO TECHNOLOGY, INC., San Jose, CA (US)

(72) Inventors: Samar Sharma, San Jose, CA (US); Mitali Parthasarathy, Sunnyvale, CA (US); Avni Baveja, San Jose, CA (US); Ashish Purushottam Attarde, San Jose, CA (US); Biju Mathews Mammen, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 104 days.

(21) Appl. No.: 14/603,803

(22) Filed: Jan. 23, 2015

Related U.S. Application Data

(63) Continuation of application No. 14/596,064, filed on Jan. 13, 2015.
(Continued)

(51) Int. Cl.
*H04L 12/43* (2006.01)
*H04L 12/741* (2013.01)
*H04L 12/947* (2013.01)

(52) U.S. Cl.
CPC ............ *H04L 45/745* (2013.01); *H04L 49/25* (2013.01)

(58) Field of Classification Search
CPC ... H04L 45/306; H04L 41/0663; H04L 69/18; H04L 49/70; H04L 41/046;
(Continued)

(56) References Cited

U.S. PATENT DOCUMENTS 8,225,134 B2 * 7/2012 Desai .................. H04L 41/0654
714/6.2
8,693,485 B2 4/2014 Kotha et al.
(Continued)

OTHER PUBLICATIONS

U.S. Appl. No. 13/362,227, filed Jan. 31, 2012 entitled "System and Method for Configuring Service Appliances as Virtual Line Cards in a Network Environment," Inventors: Samar Sharma et al.
(Continued)

*Primary Examiner* — Andrew Lee
(74) *Attorney, Agent, or Firm* — Patent Capital Group

(57) ABSTRACT

A method, service appliance, and non-transitory media for establishing connections to virtual device contexts (VDCs) whereby a communication channel for each of the VDCs is identified based on connection data corresponding to each of the VDCs. A service appliance receives, from each of one or more VDCs located on a switch, a message containing connection data that identifies at least one communication channel between the service appliance and a corresponding one of the one or more VDCs from which the message was received. The connection data is stored in a memory accessible to the service appliance. The service appliance identifies a communication channel for each of a plurality of VDCs based on the connection data and an identifier corresponding to each of the plurality of VDCs. The service appliance establishes a connection to each of the plurality of VDCs using the communication channel for each of the plurality of VDCs.

21 Claims, 10 Drawing Sheets

Related U.S. Application Data

(60) Provisional application No. 62/056,512, filed on Sep. 27, 2014, provisional application No. 62/055,456, filed on Sep. 25, 2014.

(58) Field of Classification Search
CPC ..... H04L 41/0654; H04L 12/28; H04L 12/43; H04Q 11/04; H04J 3/1682
See application file for complete search history.

(56) References Cited

U.S. PATENT DOCUMENTS

| | | | |
|---|---|---|---|
| 2006/0031312 A1* | 2/2006 | Ellanti | H04L 41/046 709/206 |
| 2010/0185759 A1 | 7/2010 | Wu | |
| 2011/0110313 A1* | 5/2011 | Eu | H04W 24/00 370/329 |
| 2011/0299413 A1 | 12/2011 | Chatwani et al. | |
| 2013/0010811 A1* | 1/2013 | Hirose | H04J 3/1647 370/498 |
| 2013/0151908 A1* | 6/2013 | Iwanaga | G06F 11/0712 714/48 |
| 2014/0012966 A1 | 1/2014 | Baphna et al. | |
| 2014/0137109 A1* | 5/2014 | Sharma | H04L 49/70 718/1 |
| 2014/0143854 A1 | 5/2014 | Lopez | |
| 2014/0189125 A1* | 7/2014 | Amies | H04L 69/18 709/226 |
| 2014/0219289 A1* | 8/2014 | Ye | H04L 41/0663 370/420 |
| 2014/0229943 A1* | 8/2014 | Tian | G06F 9/45558 718/1 |
| 2014/0301237 A1* | 10/2014 | Yi | H04W 24/10 370/252 |
| 2015/0334090 A1 | 11/2015 | Ling | |
| 2016/0085577 A1* | 3/2016 | Gray | H04L 45/306 718/1 |

OTHER PUBLICATIONS

U.S. Appl. No. 14/596,064, filed Jan. 13, 2015 entitled "Systems, Methods, and Apparatus for Implementing Agents in Service Applicances," Inventors: Samar Sharma et al.

USPTO Nov. 30, 2016 Final Office Action from U.S. Appl. No. 14/596,064.

* cited by examiner

SYSTEMS, METHODS, AND APPARATUS FOR IMPLEMENTING AGENTS IN SERVICE APPLIANCES

CROSS-REFERENCE TO RELATED APPLICATION

This Application is a continuation (and claims the benefit of priority under 35 U.S.C. §120) of U.S. application Ser. No. 14/596,064 filed Jan. 13, 2015, entitled "SYSTEMS, METHODS, AND APPARATUS FOR IMPLEMENTING AGENTS IN SERVICE APPLIANCES." This application claims the benefit of priority under 35 U.S.C. §119(e) to U.S. Provisional Application Ser. No. 62/056,512, entitled "COMMUNICATION MECHANISMS FOR SERVICE APPLIANCES AND VIRTUAL DEVICE CONTEXTS" filed Sep. 27, 2014 and to U.S. Provisional Application Ser. No. 62/055,456, entitled "AGENT ON VENDOR APPLIANCES" filed Sep. 25, 2014. The disclosures of each of the prior applications are considered part of (and are incorporated by reference in) the disclosure of this application.

TECHNICAL FIELD

This disclosure relates in general to the field of communications and, more particularly, to providing an agent on vendor appliances, communication mechanisms between endpoints, and recovery mechanisms for failures and event handling.

BACKGROUND

Data centers are increasingly used by enterprises for effective collaboration, data storage, and resource management. A typical data center network contains myriad network elements including servers, loadbalancers, routers, switches, etc. The network connecting the network elements provides secure user access to data center services and an infrastructure for deployment, interconnection, and aggregation of shared resources. Improving operational efficiency and optimizing utilization of resources in data centers are some of the challenges facing data center managers. Data center managers seek a resilient infrastructure that consistently supports diverse applications and services. A properly planned data center network provides application and data integrity and, further, optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1A:
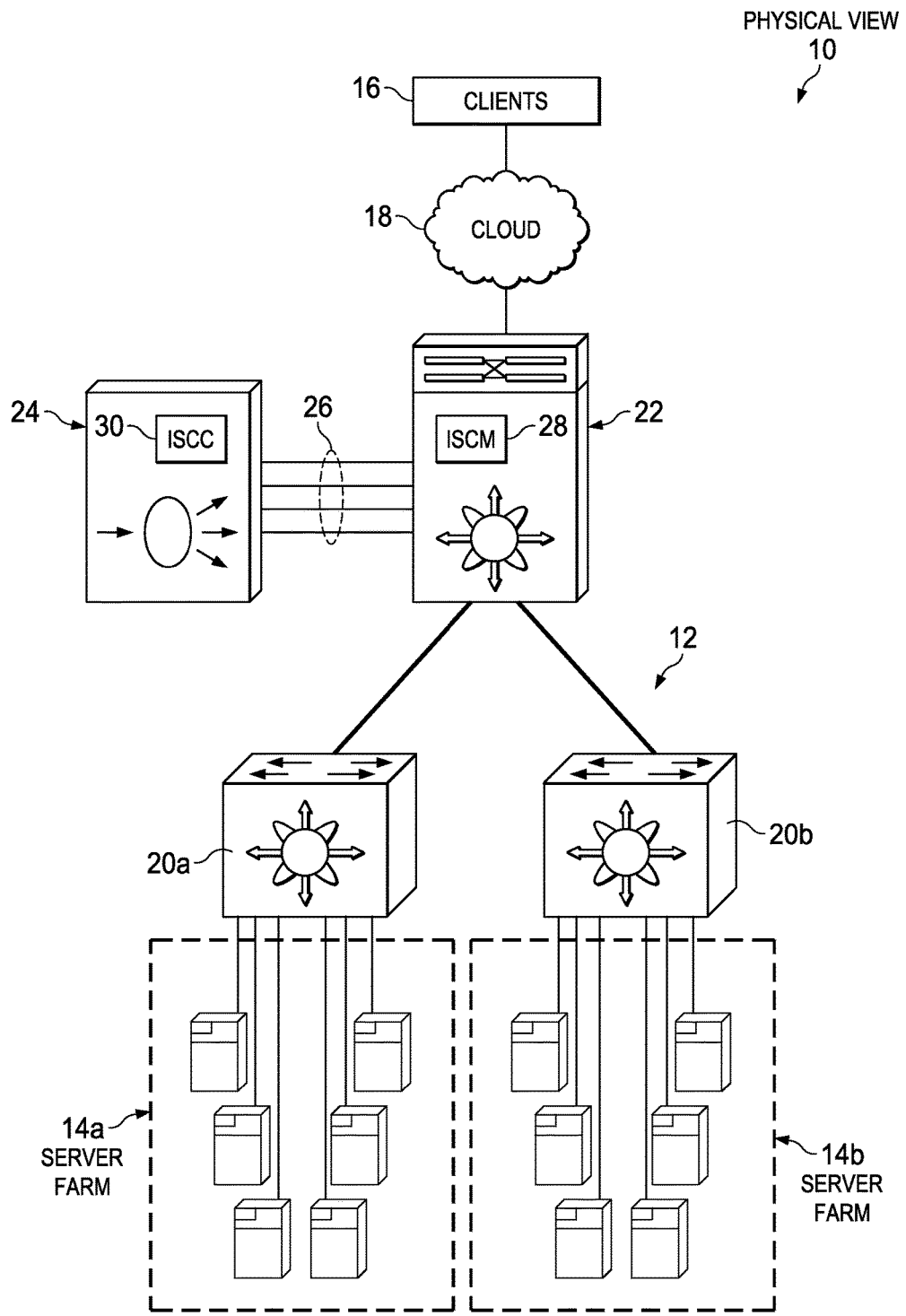
FIG. 1A is a simplified schematic diagram illustrating a physical view of a system for providing service appliances in a network environment in accordance with one embodiment.

The present disclosure describes several key features of an agent deployable on a service appliance including (but not limited to): Agent architecture/design, Transport and Channel abstractions of the agent, New message definition components, Channel Switching (platform independent processing), Channel state machine, Platform dependent hooks (e.g., memory, timers), Service key data store, and Secure channel infrastructure. Many of these features alleviate the vendor of the service appliance from having to provide the features. The features and standardization thereof enable the system to be more robust (and increases code quality). The time required for integration (e.g., with other endpoints) is decreased while the risk of integration issues is also decreased. Updates to the agent can be deployed in a controlled and efficient manner. Furthermore, the agent can ensure security between a switch and the agent. The agent deployed and running on vendor appliances provides a unique way to present transport channels that run between the switch, agent, and other service appliance components.

In some examples, a method comprises intercepting, by an agent on a service appliance, a message received from a switch; and determining a destination for the message based on an opcode of the message, a channel from which the message was received, and an entry in a service table corresponding to a service associated with the message.

In other examples, an agent comprises a memory element configured to store electronic code, a processor operable to execute instructions associated with the electronic code, and a service module coupled to the processor and the memory element, wherein when the service module is executed performs operations comprising: intercepting, by the agent, a message received from a switch, wherein the agent is located on a service appliance; and determining a destination for the message based on an opcode of the message, a channel from which the message was received, and an entry in a service table corresponding to a service associated with the message.

In still other examples, one or more non-transitory media that includes code for execution and when executed by one or more processors performs operations comprising intercepting, by an agent on a service appliance, a message received from a switch; and determining a destination for the message based on an opcode of the message, a channel from which the message was received, and an entry in a service table corresponding to a service associated with the message.

In further examples, a method comprises receiving, by a service appliance, a message from each of one or more virtual device contexts (VDCs) located on a switch, wherein the message contains connection data that identifies at least one communication channel between the service appliance and a corresponding one of the one or more VDCs from which the message was received; storing the connection data in a memory accessible to the service appliance; identifying, by the service appliance, a communication channel for each of a plurality of VDCs based on the connection data and an identifier corresponding to each of the plurality of VDCs; and establishing, by the service appliance, a connection to each of the plurality of VDCs using the communication channel for each of the plurality of VDCs.

In other examples, a service appliance comprises a memory element configured to store electronic code, a processor operable to execute instructions associated with the electronic code, and a service module coupled to the processor and the memory element, wherein when the service module is executed performs operations comprising: receiving a message from each of one or more virtual device contexts (VDCs) located on a switch, wherein the message contains connection data that identifies at least one communication channel between the service appliance and a corresponding one of the one or more VDCs from which the message was received; storing the connection data in a memory accessible to the service appliance; identifying a communication channel for each of a plurality of VDCs based on the connection data and an identifier corresponding to each of the plurality of VDCs; and establishing a connection to each of the plurality of VDCs using the communication channel for each of the plurality of VDCs.

In yet other examples, one or more non-transitory media that includes code for execution and when executed by one or more processors performs operations comprising receiving, by a service appliance, a message from each of one or more virtual device contexts (VDCs) located on a switch, wherein the message contains connection data that identifies at least one communication channel between the service appliance and a corresponding one of the one or more VDCs from which the message was received; storing the connection data in a memory accessible to the service appliance; identifying, by the service appliance, a communication channel for each of a plurality of VDCs based on the connection data and an identifier corresponding to each of the plurality of VDCs; and establishing, by the service appliance, a connection to each of the plurality of VDCs using the communication channel for each of the plurality of VDCs.

Example Embodiments

Figure 1B:
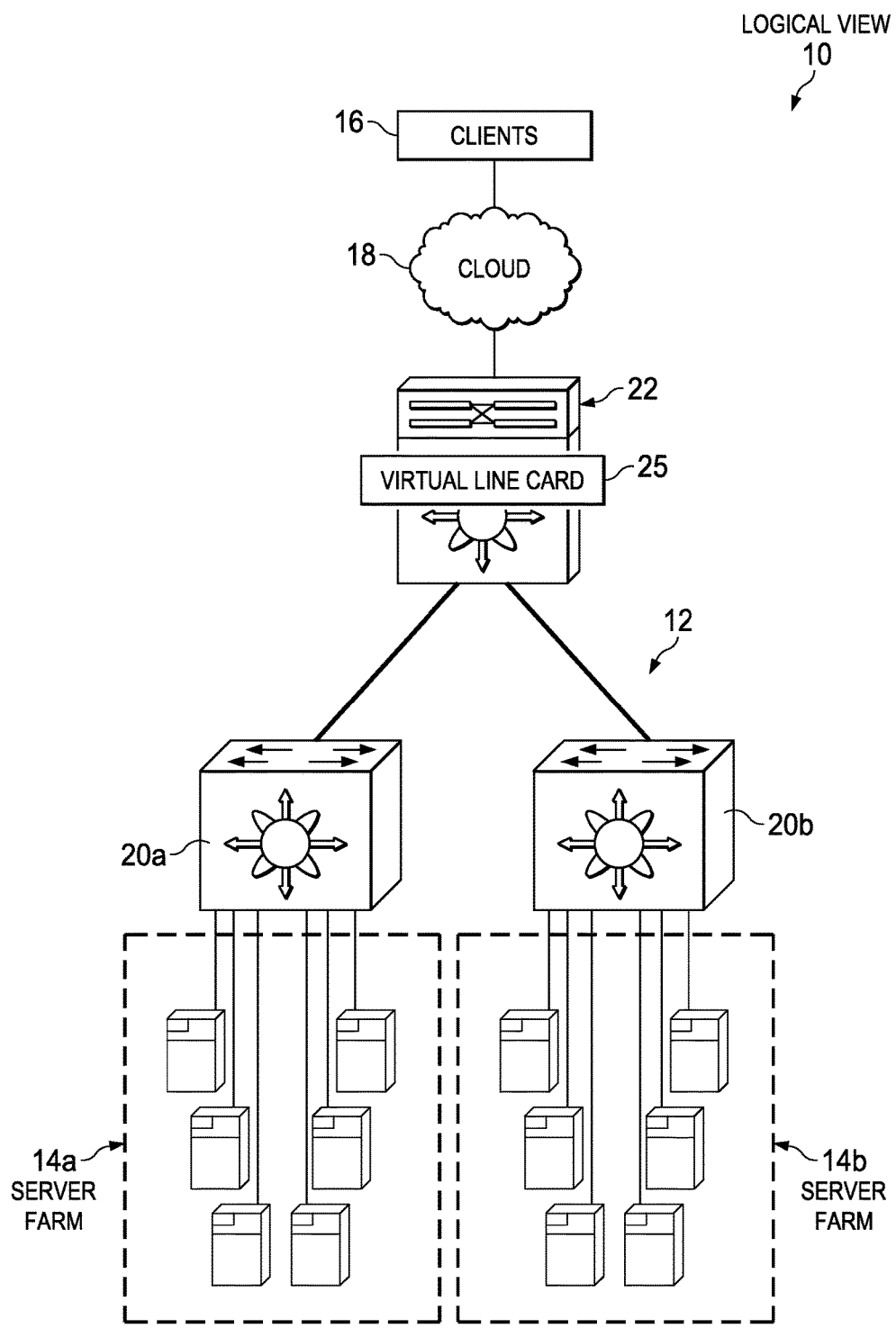
FIG. 1B is a simplified schematic diagram illustrating a logical view of the system in accordance with the embodiment.
Figure 2:
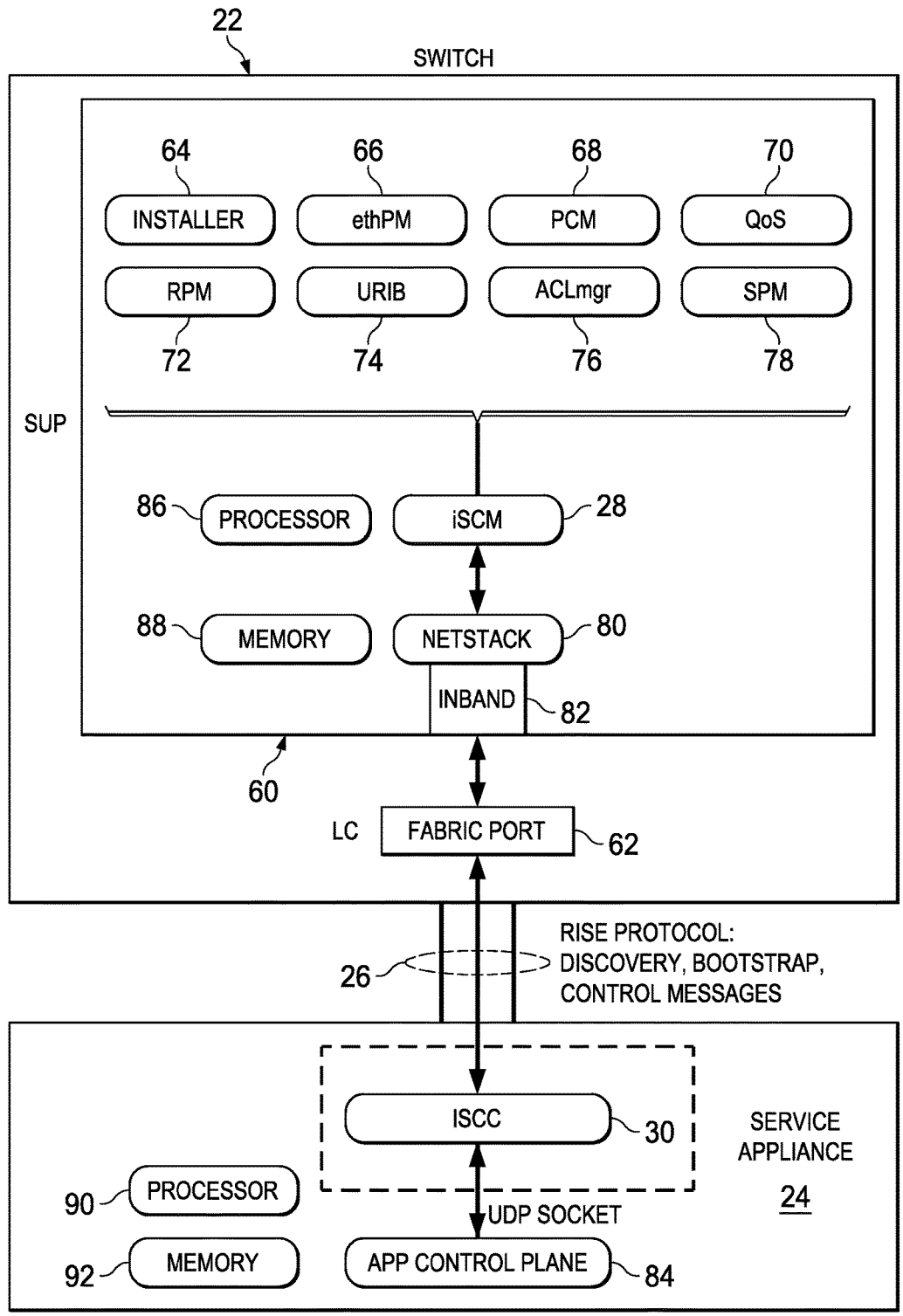
FIG. 2 is a simplified block diagram illustrating details of the system in accordance with one embodiment.

FIGS. 1A-B and 2 show examples of a system architecture for providing service appliances in a network environment, and specifically, providing service appliances as virtual line cards in a network switch. In addition, the system architecture can provide communication mechanisms in the network environment, and specifically, provide communication mechanisms between the service appliances and virtual device contexts on the network switch (e.g., for use by recovery mechanisms and/or or failure handling mechanisms). The virtual line card allows the service appliances to be located anywhere in the network, but other ways of providing the service appliance (e.g., directly connecting the service appliance on the switch) are also possible. It is noted that the examples are merely illustrative and are not intended to be limiting. Other architectures and configurations are envisioned by the disclosure.

Turning to FIG. 1A, FIG. 1A is a simplified schematic diagram illustrating a physical view of a system 10 for providing service appliances in a network environment. FIG. 1 includes a network (illustrated as multiple links 12) that connects one or more server farms 14a and 14b to one or more clients 16 via a cloud 18. Cloud 18 may encompass any public, semi-public, and/or private networks including enterprise networks, an Internet or intranet, community networks, etc. Individual servers in server farm 14a and 14b may communicate within the same farm via switches 20a and 20b, respectively. Servers in server farm 14a may communicate with servers in server farm 14b via a switch 22 in this particular example implementation.

A service appliance 24 may connect to switch 22 over a communication channel 26 (e.g., over a port-channel). As used herein, a "communication channel" encompasses a physical transmission medium (e.g., a wire), or a logical connection (e.g., a radio channel, a network connection) used to convey information signals (e.g., data packets, control packets, etc.) from one or more senders (e.g., switch 22) to one or more receivers (e.g., service appliance 24). A communication channel, as used herein, can include one or more communication links, which may be physical (e.g., wire) or logical (e.g., data link, wireless link, etc.). Termination points of communication channels can include interfaces such as Ethernet ports, serial ports, etc. In embodiments of system 10, communication channel 26 may be a single channel: deployed for both control messages (i.e., messages that include control packets) and data messages (i.e., messages that include data packets).

As used herein, a "service appliance" is a discrete (and generally separate) hardware device with integrated software (e.g., firmware), designed to provide one or more network services including load balancing, firewall, intrusion prevention, virtual private network (VPN), proxy, etc. In some cases, switch 22 may be configured with an intelligent service card manager module (ISCM) 28, and service appliance 24 may be configured with a corresponding intelligent service card client module (ISCC) 30. ISCM 28 and ISCC 30 can form part of a Remote Integrated Service Engine (RISE) infrastructure for configuring service appliance 24 on the switch, e.g., as a virtual line card in switch 22. In some cases, the service appliance is physically separate from the switch, although a communication channel (e.g., between the ISCM 28 (on the switch) and ISCC 30 (on the service appliance)) couples the service appliance and the switch. In such a case, the ISCM 28 (on the switch) and ISCC 30 (on the service appliance) enable provisioning the service appliance as a virtual line card in the switch and for enabling various communication mechanisms and recovery mechanism as disclosed herein.

Service appliance 24 may include a plurality of appliance ports, and switch may include a plurality of switch ports. The appliance ports and the switch ports may be connected in any suitable manner to form communication channel 26. In certain instances, the switch ports may be line card ports of the same type (e.g., Ethernet) as the appliance ports.

Turning to FIG. 1B, FIG. 1B is a simplified schematic diagram illustrating a logical view of system 10. In some cases, ISCC 30 and ISCM 28 may be configured to allow service appliance 24 to appear as a virtual line card 25, or some other virtual network node/entity. The terms "line card" and "service module" are interchangeably used herein to refer to modular electronic circuits interfacing with telecommunication lines (such as copper wires or optical fibers) and that offer a pathway to the rest of a telecommunications network. Service appliance is often referred simply as "appliance" or "module" herein. Hence, virtual line card 25 is interchangeable (in certain instances) with ISCM 28. A virtual service module (or a virtual line card) is a logical instance (of a service module) providing the same functionalities (as the service module). Service modules may perform various functions including providing network services (e.g., similar to service appliances). One difference between a service module and a service appliance is that the service module is physically located within a switch (e.g., on an appropriate slot) while the service appliance is physically separate from (and external to) the switch. Virtual service modules are similarly configurable within a switch.

Broadly speaking, RISE (or comparable technologies) allows (external) service appliances connect to a switch and behave like a service module within a switch without having to take up a physical slot in the switch. RISE helps consolidate how the appliances are provisioned, and enables the appliances to have the benefits of being a service module within the switch. The task for provisioning and configuring of these service appliances is performed mostly by RISE being provided on the switch, making it easy for network administrators to add/remove service appliances in the network.

According to embodiments of the present disclosure, an appliance user can enjoy the same benefit of a service module's simple configuration and operation using the infrastructure of system 10. For example, setting up service appliance 24 for network configurations may be unnecessary. Substantially all such configurations may be made via switch 22, instead of service appliance 24. Service appliance 24 may offload (i.e., transfer) any network (e.g., L2/L3 network) specific control plane and data plane operations to switch 22. Data path acceleration that leverages an application specific integrated circuit (ASIC) (potentially embedded in switch 22) may also be possible in various embodiments. Switch 22 may communicate control messages to service appliance 24 over communication channel 26. Thus, configuration and provisioning of services within service appliance 24 may be implemented via switch 22.

Note that the numerical and letter designations assigned to the elements of FIGS. 1A and 1B do not connote any type of hierarchy; the designations are arbitrary and have been used for purposes of teaching only. Such designations should not be construed in any way to limit their capabilities, functionalities, or applications in the potential environments that may benefit from the features of system 10. For ease of description, only two representative server farms are illustrated in FIGS. 1A and 1B. Any number of server farms and switches may be connected in the network without departing from the broad scope of the present disclosure.

For purposes of illustrating the techniques of system 10, it is important to understand the communications in a given system such as the system shown in FIGS. 1A and 1B. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typically, network services (also references as "services") such as loadbalancing, firewall, intrusion prevention, proxy, virtual private network (VPN), etc. are provided through one or more of the following options: (1) service appliances that connect to network switches and/or routers; (2) specially designed high-performance routers configured with the services; or (3) network devices such as routers or switches that are configured with service modules that provide the services.

Typical service appliances (e.g., loadbalancers) integrate services such as loadbalancing, firewall, intrusion prevention, VPN, etc. in a single box format, which is generally based on modular, scalable platforms and which provides the most cost-effective option of the three options listed previously. Service appliances are typically connected externally to a switch (e.g., aggregate switch or access switch, etc.) via appropriate ports. Different service appliances are designed with specific features applicable to different network environments. The service appliances may be deployed independently to service-specific areas of the network infrastructure, or they may be combined for a layered approach. Service appliances are typically located between the clients and server farms. Data packets generally pass through the service appliances on the way to (and from) the servers/clients. The service appliances may be managed by a management application (e.g., software) on the service appliance that enables configuration settings and other management functions.

Network services may also be provided by specially designed high-performance routers. Such routers may implement a massive parallel processor hardware and software architecture to deliver integrated network services (e.g., firewall, deep packet inspection, etc.). Many of the functionalities are embedded in a specially designed processor in the router. For example, such a specially designed router can provide an integrated security solution (e.g., stateful packet filtering, intrusion detection and prevention, per-user authentication and authorization, VPN capability, extensive QoS mechanisms, multiprotocol routing, voice application support, and integrated WAN interface support) and routing in a single box.

Network services may also be integrated into a network device (such as a switch or router) using dedicated line cards. The line cards are typically installed inside the device, allowing any port on the device to operate as a firewall port, while integrating the services inside the network infrastructure. Several line cards may be installed in the same chassis, providing a modular solution where needed. Such solutions permit the user to take advantage of existing switching and routing infrastructure without any costly upgrades.

Turning to the potential infrastructure of FIGS. 1A and 1B, the example network environment may be configured as one or more networks and, further, may be configured in any form including, but not limited to, local area networks (LANs), wireless local area networks (WLANs), virtual local area networks (VLANs), metropolitan area networks (MANs), wide area networks (WANs), VPNs, Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Elements of FIGS. 1A and 1B may be coupled to one another through one or more interfaces employing any suitable connection (wired or wireless), which provides a viable pathway for electronic communications. Additionally, any one or more of these elements may be combined or removed from the architecture based on particular configuration needs. System 10 may include a configuration capable of transmission control protocol/Internet protocol (TCP/IP) communications for the electronic transmission or reception of packets in a network. System 10 may also operate in conjunction with a user datagram protocol/IP (UDP/IP) or any other suitable protocol, where appropriate and based on particular needs. In addition, gateways, routers, switches, and any other suitable network elements may be used to facilitate electronic communication between various nodes in the network.

Switches in system 10, including switches 22, 20a, and 20b, may include any type of network element connecting network segments. For example, switches 22, 20a, and 20b may include a multi-port network bridge that processes and routes data at a data link layer (Layer 2). In another example, switches 22, 20a, and 20b may process data at a network layer (Layer 3), or Layer 4 (with network address translation and load distribution), or Layer 7 (load distribution based on application specific transactions), or at multiple layers (e.g., Layer 2 and Layer 3). In certain embodiments, functionalities of switches 22, 20a, and 20b may be integrated into other network devices such as gateways, routers, or servers. In various embodiments, switches 22, 20a, and 20b may be managed switches (e.g., managed using a command line interface (CLI), a web interface, etc.).

Communication channel 26 may include a port-channel, which can encompass an aggregation of multiple physical interfaces into one logical interface, for example, to provide higher aggregated bandwidth, loadbalancing, and link redundancy. Communication channel 26 with multiple links can provide a high availability channel: if one link fails, traffic previously carried on this link can be switched to the remaining links. Communication channel 26 may contain up to 16 physical communication links and may span multiple modules for added high availability. In one embodiment, communication channel 26 can represent a port-channel with an aggregation of four point-to-point communication links over multiple ports. In another embodiment, communication channel 26 can represent a virtual port-channel (vPC).

Although FIGS. 1A and 1B show server farms 14a and 14b, it should be appreciated that system 10 is not limited to servers. In fact, any network element may be connected to the network via appropriate switches, where these implementations may be based on particular needs. As used herein, the term "network element" is meant to encompass computers, network appliances, servers, routers, switches, gateways, bridges, loadbalancers, firewalls, processors, modules, or any other suitable device, component, proprietary element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. For example, server farms 14a and 14b may be replaced with LANs connecting desktop computers in a small office. In another example, server farms 14a and 14b may be replaced with a network of wireless communication devices. In yet another example, server farms 14a and 14b may be replaced with one or more supercomputers. Various other configurations and devices are contemplated within the broad framework of the present disclosure.

According to embodiments of the present disclosure, system 10 may provide for a fabric extender (FEX)-like protocol, auto-discovery, control messages in message transport service (MTS) format, control messages in a format that extends the MTS, and defined messages between service appliance 24 and switch 22. Configuration of service appliance 24 may be performed on switch 22 as for a line card. Data path forwarding may be offloaded to network line cards in switch 22. Control path processing may be offloaded to a supervisor engine on switch 22 as appropriate. In embodiments where service appliance 24 has multiple virtual services (e.g., virtual machines), each virtual service may be a separate virtual line card on switch 22.

Turning to FIG. 2, FIG. 2 is a simplified block diagram illustrating example details of system 10 according to embodiments of the present disclosure. A supervisor engine 60 on switch 22 may communicate service appliance 24 via a line card including a fabric port 62 that connects point-to-point to a node on service appliance 24. Supervisor engine 60 may include several modules such as an installer 64, an Ethernet port manager (ethPM) 66, a port-channel manager (PCM) 68, a Quality of Service (QoS) element 70, a route policy manager (RPM) 72, a unified/unicast routing information base (URIB) 74, an access control list manager (ACLmgr) 76, and a service policy manager (SPM) 78 for performing various routing and/or management functions. ISCM 28 may be provisioned in supervisor engine 60 to provide RISE related functionalities. ISCM 28 may manage one or more service modules, including in-chassis service modules and remote service modules.

In various embodiments, service appliance 24 may support stream control transmission protocol (SCTP) with various addresses (e.g., 127 addresses). In the absence of native SCTP support in supervisor engine 60, tunneling over UDP may be enforced to send SCTP packets. A Netstack module 80 may be provisioned in supervisor engine 60 for implementing TCP/IP stack for received frames hitting the control-plane of supervisor engine 60. Supervisor engine 60 may be configured with an inband port 82, which may be a virtual port that provides an interface for management traffic (such as auto-discovery) to a management processor such as a processor 86.

According to various embodiments, ISCM 28 may offer various functionalities such as handling (i.e., accommodating, managing, processing, etc.) RISE messages (e.g., in MTS format), high availability activities, timer events, packet switch stream (PSS), American Standard Code for Information Interchange (ASCII) generation, logging, event handling, health monitoring, debugging, etc. ISCM 28 may be a finite state machine utility (FSMU) based application (e.g., which indicates an abstract machine that can be in one of a finite number of states). In various embodiments, ISCM 28 may have a well-defined MTS seamless authentication protocol (MTS SAP) assigned and it can open a socket-based MTS queue and bind to the well-defined SAP such that other processes may communicate with it.

In various embodiments, ISCM 28 may also maintain an array of MTS operation code ("opcode"), which can define how to process a received MTS message. The array may include per-opcode specific MTS flags, handler functions, etc. ISCM 28 may be configured to receive CLI driven MTS messages, MTS notifications (such as event driven messages indicating, for example, that a particular VLAN is up or down), and MTS request/responses. In various embodiments, ISCM 28 may be configured so that MTS-based communication with other processes may be non-blocking and asynchronous. Thus, ISCM 28 may handle multiple events (which can arrive at any time) for the same resource such that the state of the resource is consistent (and not compromised). A similar opcode can be provided even in non-MTS messages, which serves to indicate how a switch or a service can process the message.

Subsequent to ports (e.g., appliance ports 40 and switch ports 42) being configured in RISE mode, ISCM 28 and ISCC 30 may perform auto-discovery and bootstrap to establish an appropriate control channel. After the control channel is established, applications in service appliance 24 may send control messages (e.g., using the UDP socket interface) to ISCC 30 through an application control plane 84. Application control plane 84 generally encompasses one or more software components for performing workflow management, self-management, and other application control layer processes. ISCC 30 may forward the control messages to ISCM 28 of switch 22 over communication channel 26. In example embodiments, ISCM 28 and ISCC 30 may communicate via UDP packets; however, various other protocols and formats may be accommodated by the teachings of the present disclosure. Supervisor 60 may be provisioned with (or have access to) processor 86 and a memory 88 for performing its various functions. ISCM 28 may use processor 86 and memory 88 to perform RISE related functions in switch 22. Similarly, service appliance 24 may be provisioned with (or have access to) a processor 90 and a memory 92. ISCC 30 may use processor 90 and memory 92 to perform RISE related functions in service appliance 24.

Manually attaching a service appliance to a switch can result in one or more technical challenges. Traditionally, switch software is controlled manually using either a graphical user interface (GUI) or a command-line interface (CLI). If a user needs to attach a service appliance to a switch, the user needs to use the switch CLI or GUI to manually input commands to configure the service appliance and the switch for communication with one another. The difficulty of attaching an appliance to a switch is further increased by the different platforms that switches and appliances have, thereby requiring the user to know both platforms to configure the switch and the appliance. One way to address this issue is to provide a messaging scheme between a switch and the appliance to harmonize the communication between the switch and the appliance. However, implementing the messaging scheme for communication between the switch and appliance can have some challenges if not managed properly. Generally, challenges associated with implementation of a messaging scheme can include:

Replication of effort,
Inconsistent implementation of features,
Lack of abstraction from application specifics (platform dependent specifics),
Increased time to market and low speed of deployment, and
Complexity due to platform dependencies in disparate platforms, operating systems (OS), and the like.

In addition, the appliance may need to be able to handle (e.g., receive and properly respond to) communication from its own Platform Independent (PI) and Platform Dependent (PD) components that handle its network stack, forwarding path, etc. The appliance also may need to be able to segregate the messages from different switches and manage connections to those different switches. The connections can include different service channels and discovery channels, each of which may need to be handled (e.g., multiplexed and/or de-multiplexed with one another) appropriately. Many of these issues prevent (in traditional systems) a plug-and-play solution to appliance provisioning and configuration.

A solution to any one or more of the issues mentioned above (and other issues) is to provide an agent on a service appliance. Rather than requiring a vendor of a service appliance to implement the messaging scheme, an agent in the form of binary or code package can be provisioned on the service appliance (loadable onto a computer-readable storage medium associated with the service appliance). In this manner, the service appliance can easily implement the messaging scheme without expending too much effort in implementing the functions relating to the messaging scheme. This agent can reside with an ISCC (e.g., the ISCC as described above), and is referred interchangeably with ISCC. The agent can be provided with a variety of capabilities for the vendor appliance to alleviate any one or more of the issues mentioned above. Furthermore, and perhaps more importantly, the agent is implemented with non-trivial aspects to ensure messaging is performed properly on the appliance.

Many of these features alleviate the vendor of the service appliance from having to provide the features on their own. The features and standardization thereof enables the system to be more robust (and increases code quality). Speed of integration can be decreased while also decreasing the risk of integration issues. Updates to the agent can be deployed in a controlled and efficient manner (by simply updating/transmitting a new binary to the service appliance (e.g. from a server or switch), or adding an opcode in the agent). Furthermore, the agent can ensure security is provided between a switch and the agent.

Figure 3:
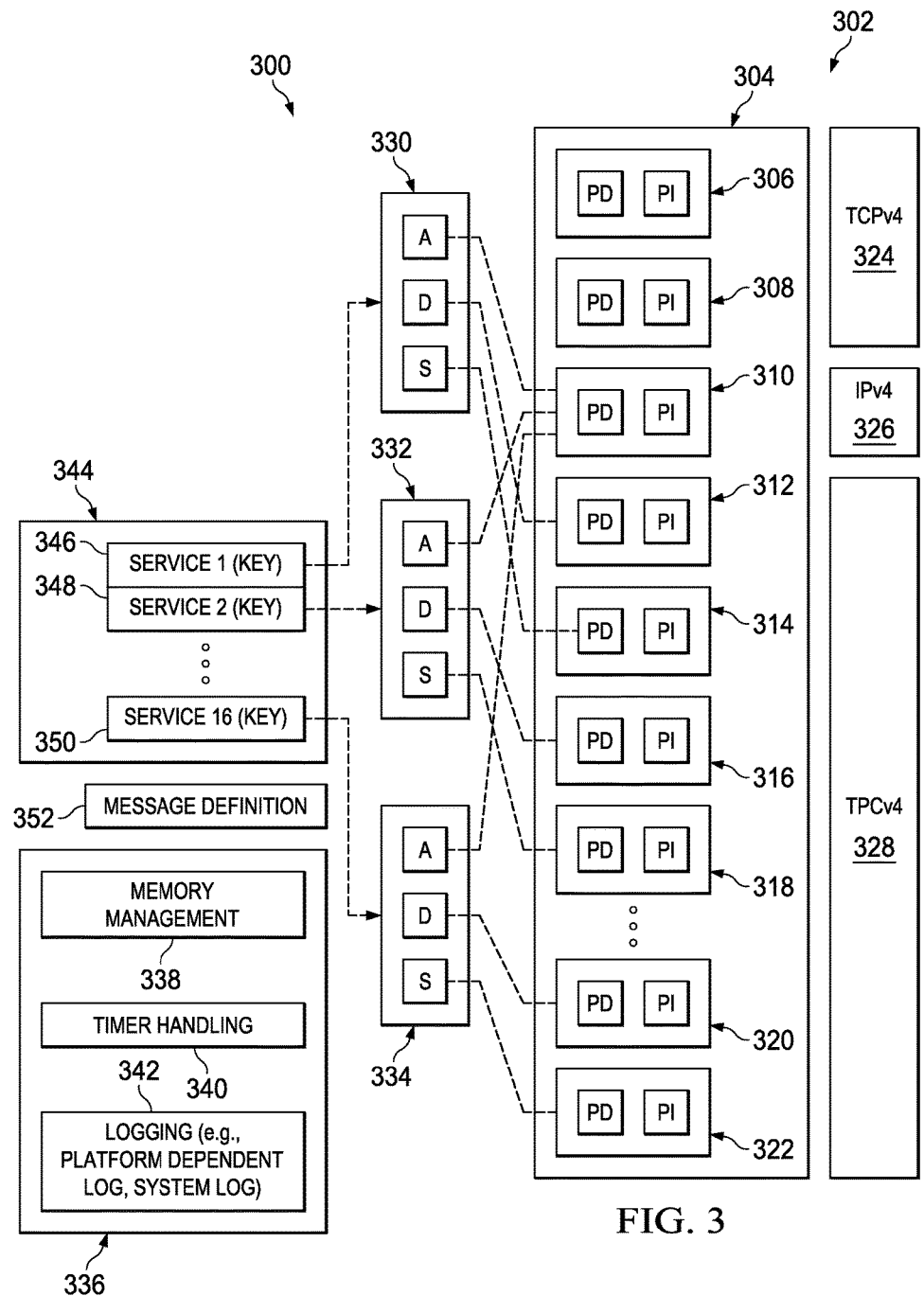
FIG. 3 is a simplified block diagram illustrating an architecture for providing an agent on a vendor appliance in accordance with some embodiments of the disclosure.

The agent (or sometimes referred herein as ISCC) can be implemented as a software component. Turning to FIG. 3, FIG. 3 is a simplified block diagram illustrating an architecture for providing an agent (300) on a vendor appliance in accordance with some embodiments of the disclosure. In this example, the agent includes: transport and channel component 302; underlying transport implementations (IPv4, IPv6, TCP, UDP, etc.) 324, 326, and 328; services 330, 332, and 334; service table 344; message definition component 352; and abstract application programming interfaces (APIs) 336. The abstract application programming interfaces (APIs) 336 include a memory management API 338, a timer handler 340, and a logging API 342.

The transport and channel component 302 comprises transport container 304 and channels 306, 308, 310, 312, 314, 316, 318, 320, and 322. The transport container 304 stores (among other things) data identifying each of the channels. In some examples, each of the channels is an instance of a channel structure. A channel structure defines, among other things, how messages are to be passed from one point to another. Each of the channels includes a platform independent (PI) part (labeled "PI" in FIG. 3) and a platform dependent part (labeled "PD" in FIG. 3). The agent advantageously abstracts details of the underlying platform-dependent protocol to enable messages to be exchanged between the switch and the appliance seamlessly. Channel 306 is an instance of discovery server channel structure (e.g., a channel structure of type "server" and/or "discovery server"), and is an abstraction of a server channel for accepting incoming connections from the agent for new service. Channel 308 is an instance of a service server channel structure (e.g., a channel structure of type "server" and/or "service server"), and is an abstraction of a service channel for accepting incoming connections from an ISCM for new service. Channel 310 is an instance of an application channel structure (e.g., a channel structure of type "application"), which is an abstraction of an application channel for providing the communication between an application (e.g., on a service appliance) and the agent. Each of channels 312, 316, and 320 is an instance of a discovery channel structure (e.g., a channel structure of type "discovery"), and is an abstraction of a channel that is to be used for transferring (i.e., transmitting and receiving) bootstrap sequences, health monitoring, and/or metadata regarding a service. Each of channels 314, 318, and 322 is an instance of a service channel structure (e.g., a channel structure of type "service"), and is an abstraction of a channel that is to be used for creating services, and for transferring (i.e., transmitting and receiving) configuration messages (e.g., automated policy-based routing (APBR), Route Health Injection (RHI), etc.) for existing services. The agent transmits and receives handshake and heartbeat messages through the discovery channels 312, 316, and 320. The agent transmits and receives RISE features like policy based routing, route health injection, and the like through the service channels 314, 318, and 322. A reason for separating them is that the discovery channel monitors the health of the appliance and its messages should not compete for bandwidth with lower priority service channel messages.

The service table 344 stores service keys and mappings of the service keys to the various channels instantiated in the agent for particular services. In some examples, a service key comprises an identifier of a switch on which the service is hosted, and an identifier of a slot on which the service is hosted (e.g., where the slot is located on the switch). In such an example, the service key identifies a specific switch and a specific slot on the switch. The service keys may be mapped to an instance of a service. The service table 344 enables lookup for active services within the service table. Furthermore, the agent uses the service table 344 to provide service level encapsulation for TCP connections within the switch. The service table 344 being organized by service keys allows the service appliance (and/or agent) to connect to many switches (i.e., provide multiple RISE services) at a time while maintaining correct mappings of the switches to the corresponding channels in the service appliance. Furthermore, the service table 344 provides an extensible design for application level data per-channel with APIs to access that information. The agent (i.e., agent 300) may intercept a message transferred between a switch and a service appliance and, at least in part, utilize the data in the service table 344 to determine a destination for the message. In some examples, the destination (or end point) for the message may be determined based on one or more of: an opcode of the message, a channel from which the message was received, an entry in the service table 344 corresponding to a service associated with the message.

The service table 344 stores an array of service table entries, stores metadata describing the service table entries, and can execute functions that add a service to the table, remove a service form the table, and/or retrieve a reference to an existing service from the table.

Figure 7:
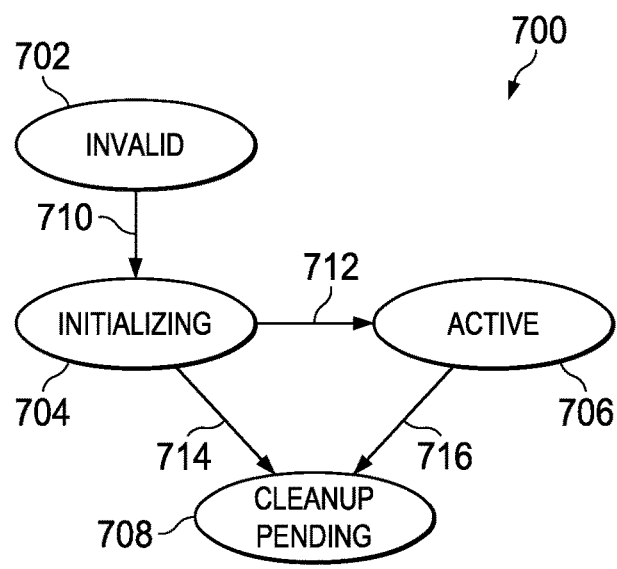
FIG. 7 is a simplified state machine diagram illustrating different states associated with a communication channel.

In the example of FIG. 3, an agent (and therefore the appliance on which the agent resides) can support many services. The service table 344 stores 16 service table entries, each service table entry containing a service key. Thus, the agent 300 can support a maximum 16 live services (e.g., services with an "ACTIVE" status as illustrated in FIG. 7) at a time (other implementations may support a different number of live services). Thus, the service table 344 includes 16 service keys corresponding to 16 services (however, any number of services can be supported greater to or less than 16). Each service has a corresponding service key stored in an entry of the service table 344 (where each service key uniquely defines the service configured on the switch), and each service in the service table has a data structure. Each service table entry stores a reference (e.g., a pointer or other identifier) to an instance of the data structure corresponding to each service (e.g., as indicated by the dashed lines between the service table entries and the service instances). Service table entry 346 stores a reference to service 330, service table entry 348 stores a reference to service 332, and service table entry 350 stores a reference to service 334. Each service comprises at least three channels. Two channels between an ISCM and the agent, i.e., a discovery channel and a service channel; and another channel between the agent and an application. For each service, the data structure specifies information related to these components (e.g., channels and data associated therewith): discovery, service, and application (i.e., labeled "D", "S", and "A", respectively in FIG. 3). The information, for example, can specify the mapping of different components of a particular service to the appropriate transport channels (illustrated by dashed-lines in FIG. 3 connecting components "D", "S", and "A" of a particular service (one end point) to a corresponding transport channel (the other end point)). In other words, each of these components of data structures points to a corresponding transport channel (e.g., a software abstraction to allow two entities to communicate with each other). The data structure corresponding to service 330 specifies that the service 330 utilizes the application channel 310, the discovery channel 312, and the service channel 314. The data structure corresponding to service 332 specifies that the service 332 utilizes the application channel 310, the discovery channel 316, and the service channel 318. The data structure corresponding to service 334 specifies that the service 334 utilizes the application channel 310, the discovery channel 320, and the service channel 322. For each connection of an appliance to a switch, the service key helps to connect the switch to the appropriate instantiated channels (e.g., service channel, application channel, discover channel, and the like) for the switch. The agent maintains the service table 344 and uses the table to determine appropriate service specific channels (e.g., a service channel is looked up using service table when an application sends a configuration message intended for a specific service). The services can be uniquely identified based on a key (e.g., a service key) comprising a service name, and VPC number combination assigned on a switch (ISCM on the switch).

The message definition component 352 comprises a library, which includes message type definitions. A message type definition defines (e.g., using the library) a structure (e.g., a format) for messages (i.e., a message structure) used in communication between the switch and the service appliance. The message definition component also defines opcodes and corresponding payload content. For example, the message definition component may store one or more tables. A table may store entries that associate an opcode to type of channel (e.g., discovery, application, service, and the like) for transmitting a message. Using such a table, the agent can determine the type of channel on which to transmit the message based on the opcode. Thus, the opcode can be used to determine a destination for the message. The agent uses message type definitions to construct a payload for various types of messages to be sent to the switch (i.e., the ISCM on the switch) or to the service appliance (i.e., an application, the agent, or any other component on the service appliance). The library may provide a type-length-value (TLV) operation application programming interface (API) for constructing a message to be sent to the switch (ISCM) or to the service appliance (ISCC or agent), and de-TLV operation API for deconstructing (e.g., parsing) the message received from the switch (ISCM) or from the service appliance (ISCC or agent). For example, the agent can use the library to encode the payload of a message in a TLV to be transmitted over a network. Likewise the agent can use the library to decode the payload of a message from a TLV to be transmitted over a network. The library may implement an encryption and/or decryption operation using native Data Encryption Standard (DES) encryption/decryption algorithm, or other standardized encryption algorithm/scheme (to provide secure channels, e.g., secure channels between ISCM and ISCC). The library is transparent to the application. All these library functions alleviate the vendor from having to implement any one of these features.

The agent provides a well-defined and robust way for a switch to communicate with an appliance (and vice versa) while reducing the burden of complex integration with various platforms (e.g., platforms from one or more vendors of appliances). When a RISE service is configured with the minimum required parameters, an ISCM running on a supervisor of a switch can (among other things): create services, transmit messages to application processes running on an appliance, receive messages from the application processes running on the appliance, and exchange messages with the application processes running on the appliance (e.g., transmit or receive messages in response to receiving or transmitting messages to the application processes running on the appliance). Advantageously, the agent defines transport layer abstractions needed for an active supervisor-to-application session. The agent can include a Platform-Independent (PI) code (as illustrated by the "PI" components of channels 306-322 in FIG. 3) and a complementary platform-dependent (PD) application code (as illustrated by the "PD" components of channels 306-322 in FIG. 3). The PI code provides a framework (via interfaces) for the PD code that specifies how the PD code will interact with the agent and or switch. Because all PD code relies at least in part on the framework of the PI code, the PD code for the various platforms utilize a single framework and, thereby reduces the burden of complex integration with the various platforms.

In some examples, the PI code implements: (1) a message definition component that defines messages, opcodes and corresponding payload content (e.g., message definition component 352); (2) a transport and channel component (e.g., component 302), which is an abstraction that forms the core ISCC infrastructure functionality; (3) instances of service structures (e.g., 330, 332, and 334), which bind a service (ISCM to ISCC connection) and corresponding details such as communication channels for a service and related information; (4) a service table (e.g., service table 334), which is a lookup structure that enables lookup for active services based on service key, and/or (5) abstract APIs (e.g., abstract APIs 336) for utilities such as timers, logging and memory management. In some examples, the PD code implements: transport scheduling infrastructure; native channel implementation (e.g., 324, 326, 328); and/or initialization of utility APIs (times, logging, etc.) for native implementation (e.g., creating concrete classes and/or instances that implement the abstract APIs).

The agent provides platform independent abstraction with hooks for platform dependent implementation. In other words, the platform dependent implementation utilized the platform independent abstractions (e.g., by creating classes and/or instances of classes that follow parameters specified in the platform independent abstractions). This allows a service appliance to implement its own platform specific (i.e., platform dependent) inter-process communication while using the agent (ISCC) for communication to the switch. The hooks also provide an abstraction or API for utilities such as timers, logging, and memory management. This allows the underlying platform of the service appliance to be decoupled from the process needed to communicate with the switch (e.g., the underlying platform may be any platform, or interchanged with other platforms), as long as the hooks are provided to allow the agent to perform properly.

Figure 4:
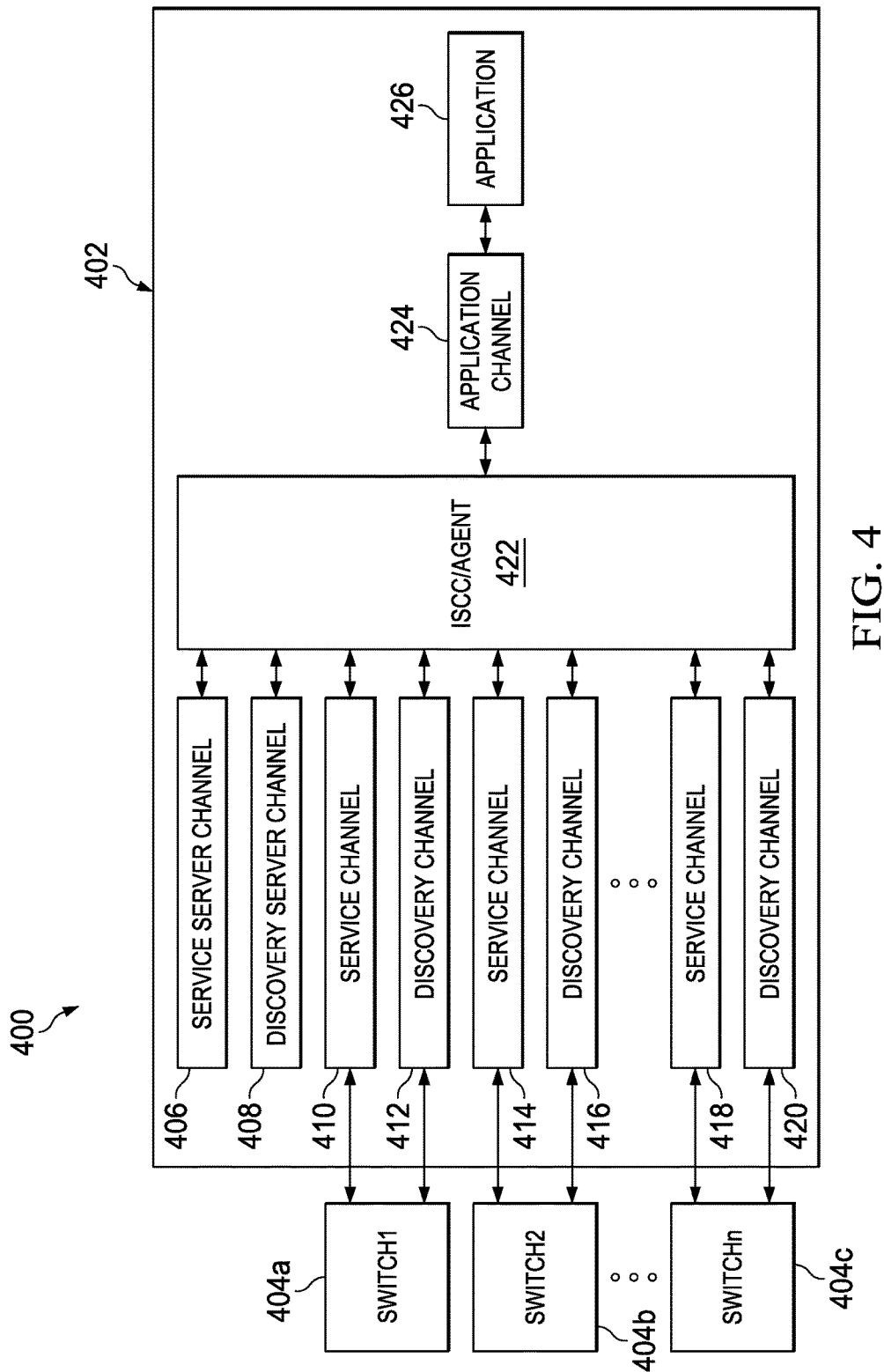
FIG. 4 is a simplified block diagram illustrating mapping of channels to multiple switches, according to some embodiments of the disclosure.

Turning to FIG. 4, FIG. 4 is a simplified block diagram illustrating a system (system 400) in which an agent includes channels mapped to multiple switches, according to some embodiments of the disclosure. System 400 includes service appliance 402, and switches 404a, 404b, and 404c. The service appliance 402 includes an agent 422 and an application 426. The agent 422 communicates with the application 426 using application channel 424. In some cases, the underlying channels (i.e., physical channels correspond channels 410, 412, 414, 416, 418, and 420) can be assumed to be reliable in nature or is left to the source of the messages to retransmit if the message did not use the channel appropriately. The agent 422 communicates with switch 404a over service channel 410 and discovery channel 412. The agent 422 communicates with switch 404b over service channel 414 and discovery channel 416. The agent 422 communicates with switch 404c over service channel 418 and discovery channel 420. The agent 422 may communicate with one or more servers over service server channel 406 and discovery server channel 408.

The agent 422 may receive (e.g., via a discovery server channel 408 and/or a service server channel 406) an incoming connection from an ISCM (on a switch) for new service (e.g., receive data identifying the service and/or data needed to create instance of one or more channel structures for the service). The agent 422 may create new discovery channels and/or service channels based on the incoming connection from an ISCM for new service (e.g., create discovery channels for a new service received via the discovery server channel 408 and/or create service channels for a new service received via the service server channel 406). The newly created service channels may be associated with a corresponding service (e.g., an existing service or a new service). The association may comprise retrieving an identifier that identifies the channel and storing the identifier in an instance of a service structure that identifies the corresponding service.

In operation, as new services are added to the service appliance 402, the agent 422 creates corresponding pairs of channels (e.g. a service channel and discovery channel) for each of the new services. For example, a first service corresponding to service channel 410 and discovery channel 412 may be set up on the switch 404a. The switch may transmit bootstrap messages to agent 422 over discovery channel 412. The bootstrap messages may include data identifying the new service and include data required to instantiate a service structure corresponding to the service. Based on the data received (in the bootstrap messages) from switch 404a, the agent 422 may create an instance of a channel structure corresponding to service channel 410. After creating the service channel, the agent 422 may store an association between service channel 410 and the instance of the service structure corresponding to the service. The correspondence between the service and the service channel may be stored in a service table (e.g. service table 344 or a service table entry therein). A similar association between the service and the discovery channel 412 may be stored in service table 344 or in the service table entry. A second service corresponding to service channel 414 and discovery channel 416 may be created between switch 404b using a process that matches that described with respect to the first service. This process may be repeated n number of times (e.g., where n is a number greater than or equal to equal to 1). A third service corresponding to service channel 418 and discovery channel 420 may be created between switch 404c using a process that matches that described with respect to the first service. In the example of FIG. 4, agent 422 includes components similar to those in agent 300 (FIG. 3). The data structures stored by agent 422 match those illustrated in FIG. 3. In addition, the data structures correspond to the physical and logical components illustrated in FIG. 4. For example, service table entry 346 (in FIG. 3) corresponds to the first service (i.e., service channel 410 and discovery channel 412). Service table entry 348 (in FIG. 3) corresponds to the second service (i.e., service channel 414 and discovery channel 416). Likewise, service table entry 350 (in FIG. 3) corresponds to the third service (i.e., service channel 418 and discovery channel 420). Thus, the agent 422 updates and maintains the service table based on insertion of, deletion of, and modification to the services that it supports. Once the services have been instantiated by the agent, the agent can use the instances stored in the service table to determine how to transmit messages between switches 404a-c and components on the service appliance 426 (e.g., application 426). The agent 422 may use a combination of the contents of a message, a type of the message, the channel on which the message was received, or entry in the service table that corresponds to a service associated with the message to determine a destination for the message.

FIG. 4 illustrates (among other things) that a destination channel to which an incoming message gets switched depends data associated with the incoming message. For example, the destination may be determined based on a type of message (e.g., opcode) and an incoming channel on which the message is received. Since the agent 422 can maintain an internal lookup table that is used to select a specific channel (e.g., a channel corresponding to the service) from a plurality of channels (e.g., a service channel is looked up using service table when an application sends a configuration message intended for a specific service). Messages transferred between any of the switches 404a-404c and the application 426 (or any other component on the service appliance 422) are transmitted via the agent 422. The transferred messages may include: messages transmitted from an ISCM on any of the switches 404a-404c to the application on the service appliance, messages transmitted from the application on the service appliance to an ISCM on any of the switches 404a-404c, or messages transmitted from the application on the service appliance to the agent, and/or messages transmitted from an ISCM on any of the switches 404a-404c to the agent. In effect, the agent 422 serves as an intermediary entity (or proxy) for the switches and for components on the service appliance; the agent 422 intercepts a message (or a plurality of messages), and processes the message to determine a destination of the message (i.e., a component to which the message or data derived from the message should be transmitted, if any). The determination may be based on based on one or more of: an opcode of the message, a channel from which the message was received, and/or an entry in a service table corresponding to a service associated with the message. The destination of the message may be a component the on the appliance, a component on a switch, or the agent that intercepted the message. If it is determined that the destination is a component the on the appliance or a component on a switch, the agent transmits at least a portion of the message (and/or a response to the message) to the component the on appliance or the component on a switch. If it is determined that the destination is the agent, the agent may consume the message itself (i.e., act upon the message without passing the message onto other components of the appliance or switch). In other examples, if it is determined that the destination is the agent, the agent may (e.g., instead of or in addition to consuming the message) transmit at least a portion of the message (and/or a response to the message) to a component on the appliance or a component on the switch.

In some embodiments, a message (e.g., a RISE message) comprises an opcode and a corresponding payload content. The agent does the switching of messages between channels based on their opcode and incoming channel (and the services to which the messages correspond). Typically, what is received over the application channel is sent to service channel and vice-versa. Some messages are terminated in (e.g., consumed by) the agent itself and not forwarded or switched. The health monitoring message sequence via discovery channel can be terminated on ISCC itself.

An active service consists of two channels between ISCM and ISCC (e.g., a discovery channel and a service channel). Each channel may maintain the statistics counters. These are intended as PD read-only, PI readable/writable. The discovery server channel can be used as a server channel for accepting incoming connections from ISCM for new service. The service server channel can be used as a service channel for accepting incoming connection from ISCM for new service. The newly accepted connection from discovery server channel and/or service server channel can be used to create new discovery/service channel dynamically and later on it is associated with appropriate existing service or a new service is created. The discovery channels can be used for bootstrap sequence and health monitoring. The service channels can be used for service creation. Once the live session is established it is primarily used for RISE configuration message (e.g., automated policy-based routing (APBR), Route Health Injection (RHI), etc.) handling. The application channel can provide the communication between application and ISCC.

Figure 5:
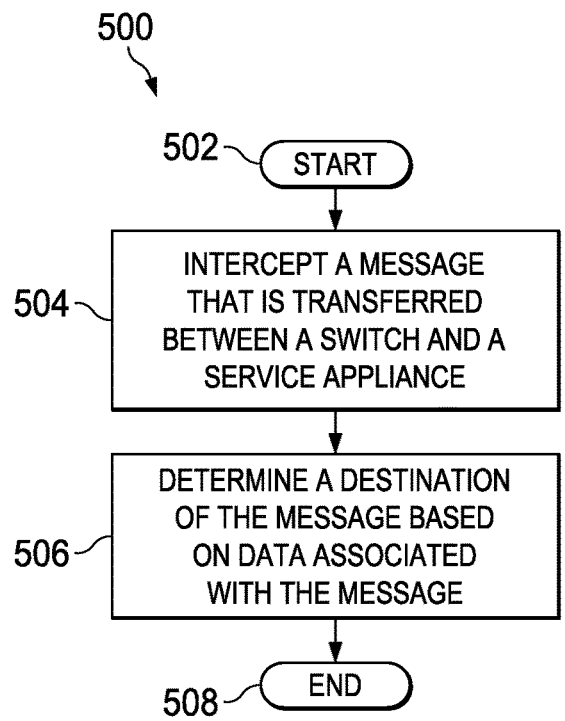
FIG. 5 illustrates an exemplary logic (logic 500) for an agent according to an embodiment of the present disclosure.

Turning to FIG. 5, FIG. 5 illustrates an exemplary logic (logic 500) for an agent according to an embodiment of the present disclosure. Logic 500 begins at a 502 and advances to 504 where the agent intercepts a message that is transferred between a switch and a service appliance. The transferred messages may include: messages transmitted from an ISCM on a switch to a component on a service appliance, messages transmitted from a component on a service appliance to an ISCM on a switch, or messages transmitted from the component on a service appliance to the agent, and/or messages transmitted from an ISCM on a switch to the agent. Any messages (or pings) transmitted by the switch or any messages (or pings) transmitted by the appliance may traverse the agent. Agent serves as an intermediary entity, and examines the message that was intercepted at 504. When the message has been intercepted, the agent then advances from 504 to 506.

In some examples, the channel from which the message was received is a first channel, the first channel connecting the service appliance to the switch. For example, the message may be received over an application channel. The logic may further determining, from a plurality of types of channel, a type of channel over which to transmit the message based on the opcode of the message, the channel from which the message was received, and the entry in the service table. For example, the logic may determine one type of channel from a plurality of types of channel (e.g., application channel, service channel, discovery channel) over which to transmit the message. The agent can determine whether the message (received from the application channel) should be passed onto the service channel, or whether the message should be passed onto the discovery channel. The agent can also implement a function to determine whether to pass messages sent from the service channel to the application channel, and likewise implement a function to determine whether to pass messages sent from the discovery channel to the application channel. Advantageously, the agent alleviates the service appliance from having to implement the logic. The vendor of the service appliance would only need to provide platform dependent hooks that can hook to the agent and would be able to easily reap the benefits of the agent. Once a type of channel has been determined, the agent may identify a second channel based on the type of channel and an identifier corresponding to the service associated with the message. For example, the transport container (e.g., 304 in FIG. 3), may contain a function that outputs a reference to a particular channel (i.e., a second channel) when the type of channel and an identifier corresponding to the service associated with the message (e.g., service key) is provided as input to the function (e.g., the output is determined using, at least in part, a service table).

At 506, the agent determines a destination for the message based on an opcode of the message, a channel from which the message was received, and an entry in a service table corresponding to a service associated with the message. The determination may be based on one or more of: an opcode of the message, a channel from which the message was received, and/or an entry in a service table corresponding to a service associated with the message. The destination of the message may be a component on the appliance, a component on a switch, or the agent that intercepted the message. If it is determined that the destination is a component on the appliance or a component on a switch, the agent transmits at least a portion of the message (and/or a response to the message) to the component on the appliance or the component on a switch. If it is determined that the destination is the agent, the agent may consume the message itself (i.e., act upon the message without passing the message onto other components of the appliance or switch). In other examples, if it is determined that the destination is the agent, the agent may (in addition to consuming the message) transmit at least a portion of the message (and/or a response to the message) to a component on the appliance or a component on the switch.

In one example, a switch sends health-monitoring ping to an appliance. The agent intercepts (at 504) the ping and determines (at 506) from the opcode of the ping that it is a health-monitoring ping. The agent would then consume the ping by logging the receipt of the ping as part of the handshake, and may also complete the handshake by transmitting a message back to the switch. In another example, the switch sends a message to the appliance as part of a discovery procedure. The agent intercepts the message and determines from the opcode that the message is part of the discovery procedure. The agent would then forward message to the appropriate component of the appliance for handling discovery. After determining a destination for the message, the agent advances from 506 to 508, where the logic terminates.

There can be many different channels created for specific opcodes and represent connections between different end points. Examples include:
    Service channel [receive/transmit]
        For services delivered between switch and agent, e.g., Automatic Policy-Based Routing (ABPR) messages
    Discovery channel [receive/transmit]
        For bootstrap between switch and agent, e.g., Discovery messages
    Application channel [receive/transmit]
        For information exchanged between agent and Platform Dependent (PD) components Broadly speaking, the agent on an appliance can handle communications between the service appliance and many switches (many services), and perhaps more importantly, the agent can handle routing of the communications between appropriate channels for the particular service.

A transport and channel structure (e.g., transport and channel instance 302) is defined as an abstract connection point between two end points that can receive and/or transmit messages in a specific format and implement message filters and rules for each opcode, sender, and receiver of message. Broadly speaking, the agent has several abstractions: channel structure, transport structure, service structure, and service table structure. Specifically, the transport and channel structure provides the abstraction layer for libraries defined by and/or implemented by the platform dependent components of the appliance. In some instances, the transport and channel structure maintains a service lookup table (e.g., service table 344) that is used for transparent message switching between an application and appropriate switch. The services are uniquely identified based on a (service) key. The key allows service appliances to connect to multiple switches at the same time.

Figure 6:
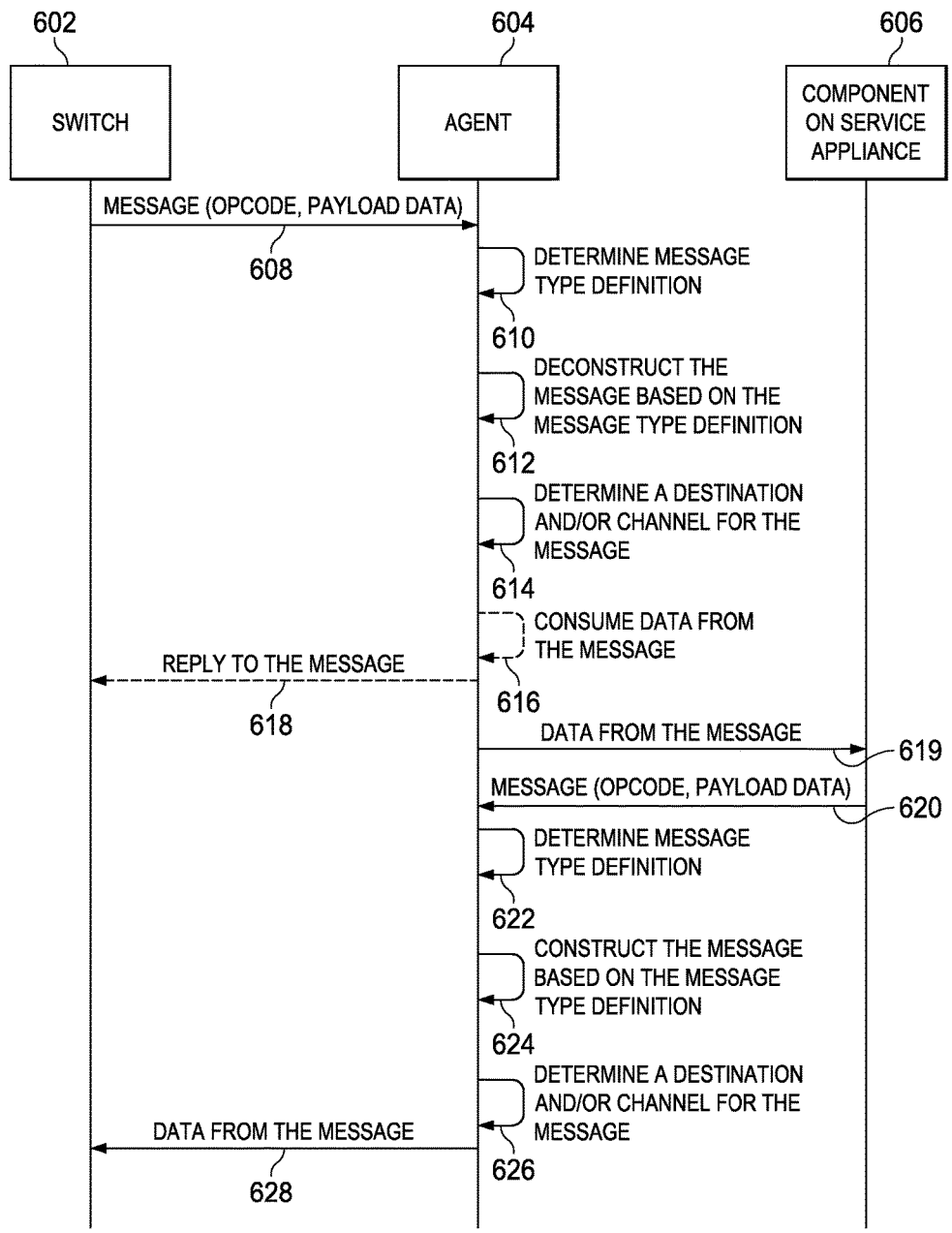
FIG. 6 is a simplified messaging diagram according to an embodiment of the present disclosure.

Turning to FIG. 6, FIG. 6 is a simplified messaging diagram according to an embodiment of the present disclosure. The diagram includes switch 602, agent 604, and a component on a service appliance 606. In the example of FIG. 6, agent 604 includes components similar to those in agent 300 (FIG. 3). The messaging diagram as shown in FIG. 6 illustrates exemplary messages that may be transmitted between corresponding devices in system 400 (FIG. 4). The switch 602 transmits status-monitoring message 608 to the service appliance 606. The agent 604 intercepts the message 608. At 610, the agent 604 determines a message type definition for the message based on an opcode in the message (using a table of correspondence between opcodes and message type definitions) in the message. At 612, the agent deconstructs the message (i.e., using the message type definition determined at 610) to retrieve the payload data. In some examples the deconstructing comprises executing a de-TLV operation to extract the payload data from the TLV encoded portion of the message. At 614, the agent determines a destination for the message (e.g., using logic similar to that discussed with respect to logic 500). The destination of the message may be a component on the appliance, a component on a switch, or the agent that intercepted the message. If it is determined that the destination is the agent, at 616, the agent may consume the message itself (i.e., act upon the message without passing the message onto other components of the appliance or switch). In further examples, if it is determined that the destination is the agent, at 618, the agent may (in addition to consuming the message) transmit at least a portion of the message (and/or a response to the message) to a component on the appliance or a component on the switch. For example, the agent may determine from the opcode of the message that the message is a health-monitoring ping. In this case, the agent determines that the destination of the ping is the agent itself (e.g., based on the ping being a portion of a handshake between the switch 404*a* and the agent 422, in the example of FIG. 4). In the example of FIG. 4, the agent 422 then consumes the ping by logging (e.g., using API 342) the receipt of the ping as part of the handshake, and may also complete the handshake by transmitting a message back to the switch. Returning to FIG. 6, If it is determined that the destination is a component the on the appliance, at 619, the agent transmits at least a portion of the message to the component on the appliance. For example, the switch sends a message (608) to the appliance as part of a discovery procedure. The agent intercepts the message and determines from the opcode that the message is part of the discovery procedure. The agent would then forward (at 619) the message to the appropriate component of the appliance for handling discovery. Processes 620, 622, 624, 626, and 628 (FIG. 6) correspond to and are similar in operation to processes 608, 610, 612, 614, and 619 (FIG. 6) respectively. A major difference is that procedure 624 constructs the message for later transmission to the switch, while the procedure 612 deconstructs the message for later transmission to the component on the appliance.

Platform independent processing implements (e.g., PI and PD functions of functions for channel switching. The agent 604 functions as a junction box or intermediary that takes incoming messages on one channel and moves the message to another channel. The agent retains the notion of which channels need TLV-ization before sending messages onto them. Some channels may need TLV-ization while others don't. The agent maintains an association among various service channels and the service notion that provides an overlay over the channel structures. The agent further maintains the service table based on keys that are exchanged in the protocol.

It is up to the vendor appliance whether to encrypt the channels between the agent and the application. However, the agent can enforce encryption on any one or more of the channels between the agent and the switch. Advantageously, the encryption is transparent to the application itself, and ensures security of packets on the channels between the agent and the switch from packet sniffing.

Turning to FIG. 7, FIG. 7 is a simplified state machine diagram illustrating different states associated with a communication channel (i.e., a channel state machine). An agent may include a channel state machine. A channel state machine defines the states of different channels and the transitions between those states. It can be seen from the FIG. 7 that a channel has many possible states including (but not limited to):

INVALID (702): indicates the channel is invalid or temporarily in an error state;

SENTINEL (not shown in the FIGURE): indicates that the channel is inactive due to being used as sentinel in circular doubly link list;

INITIALIZING (704): indicates that the channel initialization is in progress;

ACTIVE (706): indicates that the channel is initialized and ready for use; and CLEANUP PENDING (708): indicates that the channel is no longer useable and will be cleaned up.

The states are utilized by the agent to manage network resources (e.g., to clean up channels). Upon first creation, the channel is in the INVALID state 702. At 710, the channel transitions to the INITIALIZING state where it remains during an initialization period (e.g., a period of time in which an instance of the channel structure is populated with the requisite data to represent the channel, such as when either PI of a PD portion is being initialized). Once initialization is complete (e.g., and the channel has been associated with a service), the channel transitions (at 712) to ACTIVE state 706. However, if the agent has no room for a new service (i.e., is already supporting a maximum number of services) or if a service is lost or shut down before bootstrap is complete, the channel transitions (at 714) the CLEANUP PENDING state 708. If an ACTIVE channel is to be shut down, the channel transitions (at 716) into the CLEANUP PENDING state 708. In the CLEANUP PENDING state 708, a timer can be set for the channel to be cleaned up at the expiration of the timer.

As mentioned above, the agent has several abstractions including (but not limited to): channel structure, transport structure, service structure, service table structure, a service table entry structure, and a service key structure. In some examples, each of channels 306, 308, 310, 312, 314, 316, 318, 320, and 322 (FIG. 3) is an instance of the "Channel" structure defined in the following examples structures. In further examples, transport container 304 (FIG. 3) is an instance of the "Transport" structure defined in the following examples structures. In some examples, each of services 330, 332, and 334 (FIG. 3) is an instance of the "Service" structure defined in the following examples structures. In still further examples, service table 344 (FIG. 3) is an instance of the "Service Table" structure defined in the following examples structures. In some examples, each of service table entries 346, 348 and 350 (FIG. 3) is an instance of the "Service Table Entry" structure defined in the following examples structures. Note that some structures and/or components of the structures include brackets "[ ]" or parenthesis "0" comprising: a label of "PI" to indicate that the structures and/or components are platform independent, and/or a label of "PD" to indicate that the structures and/or components are platform dependent. Note that the "PI" and "PD" labels are exemplary and are non-limiting. In other examples, the structures and/or components may be differently implemented as platform independent and/or platform dependent. The example structures are as follows:

```
Transport (PI AND PD) -- A container for all of the ISCC channels
typedef struct iscc_transport_s {
    iscc_channel_t          *channel;
    iscc_channel_t          *quick_ptr[CHANNEL_TYPE_INIT_MAX];
    get_channel_by_type_func_t get_channel_by_type;
    iscc_select_func_t      select;
} iscc_transport_t;
```
○ [PI]::Channel: A pointer to a sentinel in circular doubly link list of ISCC channels
○ [PI]::quick_ptr: An array of cached pointers for discovery server channel, service server channel and application channel.
○ [PI]::get_channel_by_type: A function that outputs a reference to a particular -continued channel when channel type and service key is supplied as input (e.g., output is determined, at least in part, at using a service table).
      ○ [PD]::Select: A PD implemented scheduling functions for ISCC channels which will be invoked periodically.
Channel (PI AND PD) -- It serves as an abstraction for communication endpoint or server endpoint e.g. discovery channel, service channel, or application channel.
   typedef struct iscc_channel_s {
     channel_type_t type;
     char *name;
     int       fd;
     handle_read_func_t    handle_read;
     handle_write_func_t   handle_write;
     send_func_t           send;
     recv_func_t           recv;
     initialize_func_t     init;
     add_opc_func_t         add_opc;
     clear_channel_stats_func_t clear_stats;
     get_stats_func_t        get_stats;
     void *pi;  /* Holds PD specific information */
     void *pd;  /* Holds PI specific information */
     void *rx_info;  /* PD specific receive queue info */
     void *tx_info;  /* PD specific send queue info */
     channel_state_t    state;
     struct iscc_transport_s  *transport;
     struct iscc_service_s      *svc_entry;
     /* Links for different list membership */
     struct list_head t_link;
   } iscc_channel_t;
      ○ [PI]::type: Type of channel (e.g., application, discovery, service, server, discovery server, service server),
      ○ [PI]::name: Name of channel
      ○ [PD]::fd: A file descriptor/handle for given channel, which will be initialized by PD code
      ○ [PI]::handle_read: A processing function when message read from channel
      ○ [PI]::handle_write: A processing function when message written to channel
      ○ [PD]::send: A native send function for channel
      ○ [PD]::recv: A native receive function for channel
      ○ [PD]::init: An initialization function when new connection received on given channel such as server channel.
      ○ [PI]::add_opc, [PI]::clear_stats, [PI]::get_stats : helper function for keeping channel specific statistics.
      ○ [PI]::pi: A void pointer for PI to store the information hidden from PD
      ○ [PD]::pd: A void pointer for PD to store the information hidden from PI
      ○ [PD]::rx_info: A void pointer for PD to store the receive specific information (may be receive queue) hidden from PI
      ○ [PD]::tx_info: A void pointer for PD to store the send specific information (may be receive queue) hidden from PI
      ○ [PI/PD]::state: Current state of the channel (e.g., based on channel state machine)
      ○ [PI]::transport: Back pointer to transport structure
      ○ [PI]::svc_entry: Back pointer to service that given channel belongs to
Service (Entirely PI) -- It serves as a container that holds required information specific to a live service such as all communication channels belong to a service and RISE entry for it.
   typedef struct iscc_service_s {
      struct iscc_channel_s *disc_ch;
      struct iscc_channel_s *svc_ch;
     rise_entry_t rise_entry;
     __get_svc_channel_by_type_func_t get_channel;
     __set_svc_channel_by_type_func_t set_channel;
     __get_svc_rise_entry_func_t get_rise_entry;
     __set_svc_rise_entry_func_t set_rise_entry;
   } iscc_service_t;
      ○ [PI]::disc_ch: Rise-service specific discovery channel
      ○ [PI]::svc_ch: Rise-service specific service channel
      ○ [PI]::rise_entry: Rise service details
      ○ [PI]::get_channel: Returns the specific channel from given service
      ○ [PI]::set_channel: Bind the a channel to a service
      ○ [PI]::get_rise_entry: Retrieves the rise service details (rise entry)
      ○ [PI]::set_rise_entry: Updates the rise service details with new information
Service Table (Entirely PI) -- A lookup table that stores the service key (service name & vpc id combination) and a pointer to associated live service entry.
   typedef struct iscc_svc_table_s{
      iscc_svc_tbl_entry_t
      services[RISE_MAX_SERVICES];
      int active;
      insert_service_func_t    register_service;
      remove_service_func_t   deregister_service;
      find_service_func_t       find_service;
   } iscc_svc_table_t;
      ○ [PI]::services: An array of service table entries (described below)

-continued

Figure 8:
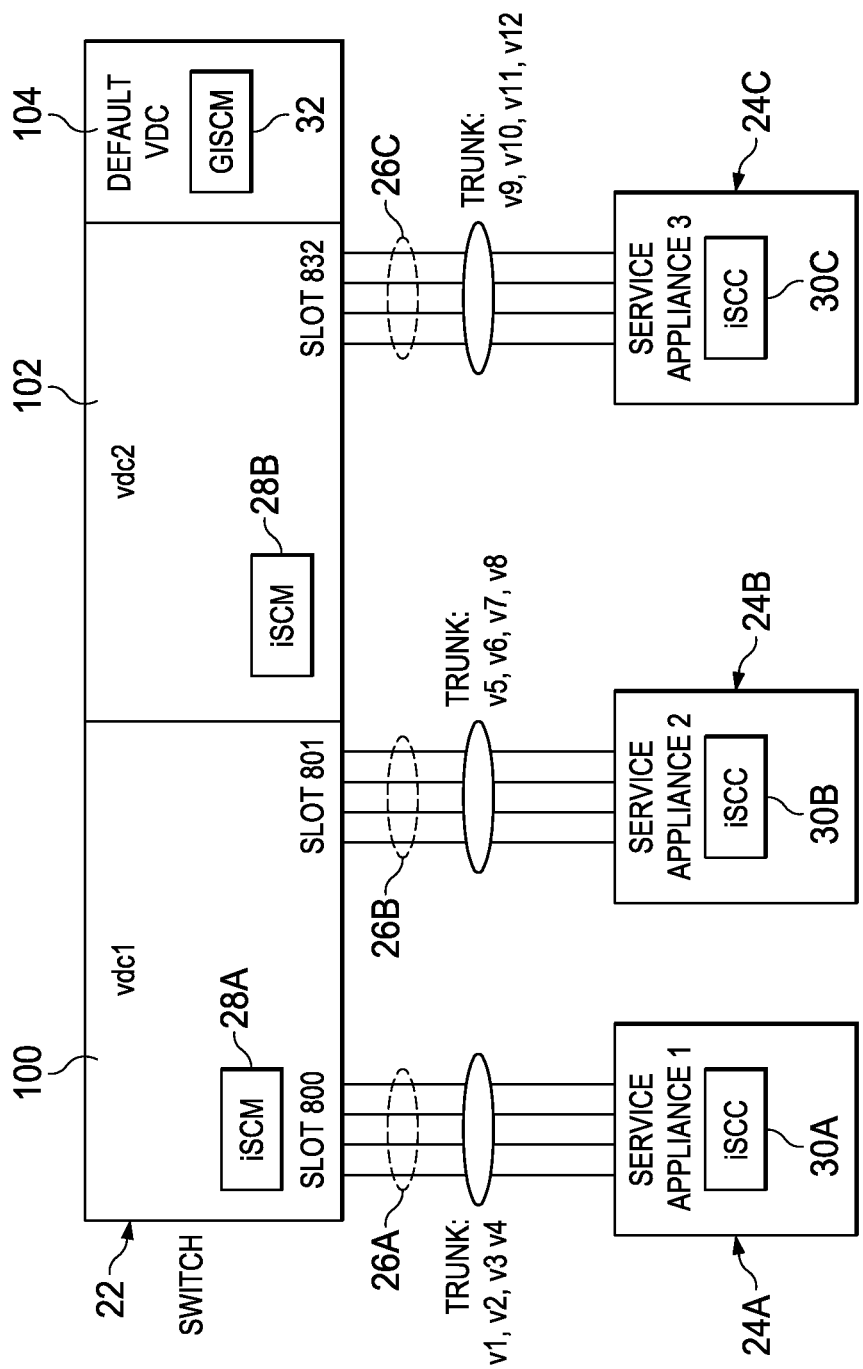
FIG. 8 is a simplified block diagram illustrating another embodiment of the system.

○ [PI]::active: Number of active service entries with in table
○ [PI]::register_service: A function to register/insert a new service into service table.
○ [PI]::deregister_service: A function to deregister/remove the service from service table.
○ [PI]::find_service: A query function to retrieve the service when service key is given to it Service Table Entry -- Defines the table entry with in service table.
typedef struct iscc_svc_tbl_entry_s {
    iscc_service_key_t svc _key;
    iscc_service_t *service;
} iscc_svc_tbl_entry_t;
○ [PI]::svc_key: A service key which is uniquely identifies the service with in the table
○ [PI]::service: A pointer to the service instance Service Key -- Defines unique service key (e.g., used to locate a service with in service table)
typedef struct iscc_service_key_s {
    char device_id [RISE_DEVICE_ID_MAX];
    uint16_t vdc_id;
    uint16_t slot_id;
} iscc_service_key_t;
○ [PI]::device_id: A unique switch id on which service is hosted
○ [PI]::vdc_id: A vdc id on which service is hosted
○ [PI]::slot_id: A slot id assigned to a service on which service is hosted Turning to FIG. 8, FIG. 8 is a simplified block diagram illustrating additional details of system 10. According to one embodiment, switch 22 may be configured as one or more virtual device contents (VDCs). VDCs allow switch 22 to be virtualized at the device level, including as multiple virtualized (logical) devices. Each configured VDC presents itself as a unique device to connected users within the framework of switch 22. The VDC runs as a separate logical entity within switch 22: maintaining its own unique set of running software processes. Each VDC can have assigned to it physical ports, a separate management domain (e.g., supervisor engine), etc. Each VDC on switch 22 may be configured with a separate ISCM. In addition, each VDC may have a unique VDC ID and a VDC name.

Service appliances 24a, 24b, and 24c may be connected to switch 22. Switch 22 may comprise two VDCs, 100 and 102, provisioned with ISCM 28a and ISCM 28b, respectively. ISCM 28a may communicate with (and/or manage) ISCC 30a of service appliance 24a, and ISCC 30b of service appliance 24b. ISCM 28b may communicate with (and/or manage) ISCC 30c of service appliance 24c. Various other configurations of service appliances and VDCs are possible within the broad framework of the present disclosure. For example, each ISCC may communicate with separate VDCs. In another example, all three ISCCs may communicate with a single VDC.

In one embodiment, ISCCs 30a-c and ISCM 28a-b may communicate using a VLAN Trunking Protocol (VTP) over communication channels 26a-c, respectively. In other embodiments, comparable protocols such as IEEE Generic VLAN Registration Protocol (GVRP), or IEEE Multiple VLAN Registration Protocol (MVRP) may be used over communication channels 26a-c for communication. The user may allocate switch ports of switch 22 for the respective service appliances 24a-c and configure them, for example, as port-channels in trunk switch mode (associating a list of VLANs). The trunk allowed VLANs on each communication channel 26a-c may include the VLANs in the VLAN group, as well as RISE-VLAN (e.g., a service appliance configured as RISE to appear as virtual line cards).

The trunk ports may be, by default, members of the VLANs that exist on switch 22, and can carry traffic for those VLANs between switch 22 and service appliances 24a-c. To distinguish between the traffic flows from various service appliances, the trunk ports may mark the frames with special tags as they pass between switch 22 and respective service appliances 24a-c. The trunk ports may be configured to specify the VLAN groups associated with the respective trunk ports. For example, communication channel 26a may be configured to associate VLANs v1, v2, v3, and v4; communication channel 26b may be configured to associate VLANs v5, v6, v7, and v8; and communication channel 26c may be configured to associate VLANs v9, v10, v11, and v12.

Establishing connections with a VDC in traditional systems can result in one or more technical challenges. Traditional systems relate to VDC integration with physical service line cards that are inserted in a slot (i.e., a module slot) on a switch. For example, in some traditional systems, a VDC (within a switch) may connect (via a communication channel) with a local service module (line card) that is physically inserted in the slot of the switch. For example, each switch chassis may have multiple physical slots (e.g., 10 module slots). A module slot number may be assigned to each of the physical module slots in the switch. For example, the module slot numbers may be 1-10 (to correspond to 10 module slots). Thus, the VDC may also correspond to a physical line card (and therefore a module slot number). A supervisor engine may be inserted into one or more of the slot. The supervisor engine may be responsible for basic operation of the switch (e.g., executing control plane and management functions). A service module, which runs a network service(s), may be inserted into any of the remaining slots. For example, a service module for providing load-balancing service (a load-balancer) can be physically inserted into a slot. In this traditional case, the service module and the switch are tightly integrated with one another (e.g., contain data specific to the other in advance of being coupled to one another and/or pre-programmed with).

Broadly speaking, these traditional systems require that, before establishing a connection with a service module, a switch have prior knowledge (e.g., preprogrammed data) regarding the service module to which it is to be connected. Because the service module and the switch are tightly integrated, when the service module is inserted into the slot on the switch, a supervisor engine on the switch already "knows" how to establish a connection with the service module. For example, the supervisor engine may communicate with a known process on the service module, e.g., to determine the type of service module (e.g., load-balancer), specifications of the service module's hardware, and/or a configuration of the service module's software. Such integration may mean that switches (and VDCs) can only communicate with a limited set of service modules (e.g., service modules produced by the same manufacturer as the switch) and not a wide range of (e.g., service modules produced by the same manufacturer as the switch as well as third-party manufacturers).

In contrast to a service module, which is tightly integrated with a switch, a service appliance is physically separate from and may be connected by a physical transmission medium to a switch. The service appliance can be any third-party service appliance (e.g., of a different maker/equipment manufacturer from the switch, etc.). Thus, the switch may have no prior knowledge regarding the service appliance (e.g., may not have access to data regarding: software on the appliance, operating system on the appliance, how to connect to the appliance, network protocols that run on the appliance, etc.). In broad sense, there are more unknown variables when connecting a service appliance to a switch than when connecting a service module to a switch (e.g., because the service module is local to and/or tightly integrated with the switch whereas the service appliance is not). As a result, a service appliance may identify the switch to which it is connected (e.g., using a switch ID) but may be unaware of VDCs available on the switch.

To address these issues, the system and methods described herein can provide communication mechanisms for relating one or more service appliances to one or more VDCs. In some examples, the communication mechanisms enable one or more service appliances to discover, create, and identify connections with one or more VDCs. These system and methods advantageously enable (remote) service appliances to connect to (and/or identify) one or more VDCs within a switch. Thus, a service appliance may have visibility of the VDCs to which it is connected (rather than only one VDC). In addition, a service appliance may retrieve aggregated data regarding one or more VDCs to which it is connected to resolve conflicts. The service appliance may take advantage of the VDC architecture disclosed herein regardless of whether the service appliance is directly connected to, indirectly connected to, or may be connected to device that is in turn connected to one or more VDCs and still take advantage of the VDC architecture disclosed herein. In addition, the systems and methods disclosed herein offer novel connection topologies (e.g., many-to-many) that are not possible with traditional systems (e.g., which may only enable one-to-one topologies). In particular, systems and methods enable m:n communication of switch context to service appliance (which may or may not have multiple contexts) where as conventional systems relate to 1:1 notion of service line card context and switch context. For example, communication between switches (and/or VDCs) and service appliances may be provided in a m:n topology, where 'm' number of switches and/or VDCs may connect to (and communicated with) a service appliance, 'n' number of service appliance may connect to (and communicate with) a switches or VDCs. One or more communication channels may be established between a switch, comprising one or more VDCs, and one or more service appliances. For example, a communication channel may be established between a service appliance and the one or more Virtual Device Contexts (VDCs) on the switch (or a subset thereof) and/or a communication channel may be established between a Virtual Device Context (VDC) and the one or more service appliances (or a subset thereof). In such a system, a service appliance can connect to multiple VDCs using the communication mechanisms access (and/or maintain) the m:n mapping between service appliances and VDCs. The communication mechanisms may include (but are not limited to) to the following: (1) Unique naming scheme for VDC connections, (2) VDC lookup on service appliance, (3) Global view of VDCs, and/or (4) Detecting inconsistent configuration across VDCs The unique naming scheme is, among other things, to provide a service appliance with visibility of (or a mechanism for identifying) multiple VDCs. In contrast to traditional systems, where physical module slots may correspond to a VDC, the number scheme described herein may be applied to relate one or more VDCs to service slot numbers, which are values given to a RISE service and/or communication channel. Supervisor software (e.g., a supervisor engine) can provide the VDC ID, VDC name, and service slot number from the VDC to the service appliance. Turning again to FIG. 8, an ISCM (e.g., any of ISCMs 28*a-b*, or any similar software process running on a supervisor process of the switch) can support multiple services from a service appliance (e.g., service appliances 24*a-b*) by providing this information (i.e., the VDC ID, VDC name, and/or service slot number) to each service via a communication channel (e.g., channels 26*a-c*) established by ISCM. For example, the VDC ID (and/or VDC name) is included in a payload of a discovery message or in a payload of a bootstrap message. Thus, upon initiating a service appliance, the service appliance may receive the VDC ID (and/or VDC name) to which it is connected. In addition, some service appliances may be fully aware of the VLAN to VDC mapping (e.g., based on the VLAN being a parameter that is input, e.g., by a user, during service creation). When a new service is created on the switch (e.g., by the service appliance), it is assigned a first available slot number from a range of reserved service slot numbers on the VDC (e.g., the lowest available service slot number from the range). The VDC may utilize the ISCM to transmit the service slot number to the service appliance (e.g., via the ISCC). The service (on a service appliance) may be identified using a combination of the service slot number and VDC ID. Each service appliance may maintain a database including the VDC ID, the VDC name, and a service slot number corresponding to each of its services. Each ISCM can retrieve and store a reference to the VDC that the service is associated with and provide the information to the service. Since the service is created on a VDC (e.g., by applying CLI commands to the VDC), an API is used (e.g., by the service) to retrieve and store a reference to the VDC when the service is created.

The service slot identifier (numbering) scheme is divided on a per VDC basis to have a globally unique slot number range, e.g., 800-831 in VDC1, 832-863 in VDC2, 864-895 in VDC3, and 896-927 in VDC4, as is illustrated in FIG. 8. As can be seen in FIG. 8, although only two slots are occupied on VDC 100 (i.e., service slot numbers 800 and 801), the service slot numbers for VDC 102 begin at 832 (and do not include 800-831), thereby maintaining the service slots numbered 802-831 reserved for VDC 100 to provide a range of unique service slot numbers for each VDC. In one example, a resource manager process is executed to identify available slots in a switch and/or to assign different subsets of the available service slots to corresponding VDCs (e.g., to create the unique slot ranges).

Each VDC has a unique identifier (i.e., a VDC ID) and a VDC name. Since the VDC ID is a unique identifier on the switch, a service can connect to multiple VDCs (e.g., by identifying each VDC based, at least in part, on the VDC ID). The ISCC maintains individual connections to each VDC in a database, or service table, or other memory element. Data that identifies the connections may be keyed based on the VDC ID and/or slot number (e.g., a primary key of the database may comprise VDC ID and/or slot number, where the primary key is used to locate and/or retrieve a particular entry in the database that has a corresponding primary key that matches a query primary key). For example, communication data identifying connections to a VDC may comprise an identifier that identifies a VDC (e.g., VDC ID and/or VDC name), a service slot number associated with the VDC (e.g., a service slot number (of the available service slot numbers) that is assigned to the VDC), and an address (e.g., IP address, or an address of a different communication protocol) for a communication channel between the VDC and a service appliance.

When a service is configured on a VDC, a unique VDC-Internet Protocol (IP) address (VDC-IP) is associated with the service. In some instances, user datagram protocol or any other suitable protocol is utilized instead of or in conjunction with IP. This VDC-IP (or more generally a VDC address) is transmitted to a service appliance (e.g., by the ISCM). The service appliance may store connection data comprising the VDC-IP in a service table. The VDC-IP is unique to each VDC, therefore, the service appliance can initiate a communication (e.g., a request) to RISE software on the intended VDC using the VDC-IP.

Figure 10:
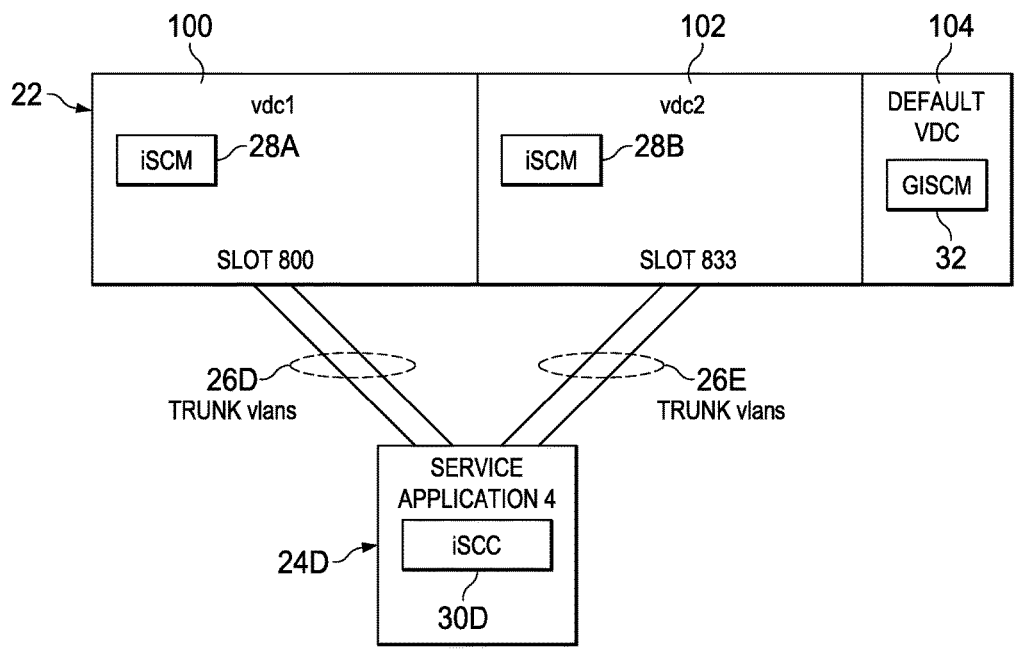
FIG. 10 is a simplified block diagram showing additional details of the system.

Each service appliance can look up a VDC based on a set of connection data containing information associated with one or more VDCs (e.g., stored in a service table). A service appliance maintains (e.g., by storing in a database, a service table, and/or or other memory) connection data comprising a VDC ID, a VDC name, and/or a slot number corresponding to each of its connections (e.g., VDC-IP, or other address) to a VDC. In addition to above, the service appliance may use a chassis ID and/or device ID (e.g., a unique identifier of the device (such as a switch) to differentiate associations between VDCs and service appliances). In some examples, each of the one or more VDCs (e.g., an ISCM or another process running on each of the one or more VDCs) transmits to the service appliance a message that includes connection data that identifies a communication channel to the VDC from which the message was transmitted (e.g., the VDC from which the message was received by the service appliance). For example, an identifier that identifies a VDC (e.g., VDC ID), and a service slot number associated with the VDC are transmitted from a process running on the one or more VDCs to the service appliance (and are received by the service appliance). The messages are utilized by a VDC to identify a communication channel at which the VDC can be reached by the service appliance. The service appliance establishes a control channel (e.g., over a communication channel) with each VDC based on connection data (e.g., data including a VDC-IP address) provided by ISCM. The service appliance may determine a communication channel for each of the one or more VDCs based on the connection data and an identifier corresponding to each of the one or more VDCs. The determining may comprise accessing an identifier that identifies a VDC, and a service slot number associated with the VDC. The identifier and service slot number may be accessed from a message or other signal received through a service on a service appliance. The service appliance may use the identifier and the service slot number to determine (or lookup), using the connection data, an address for the communication channel. In some examples, when the service appliance needs to initiate communication (e.g., transmit a message, such as a control message) with the switch, the ISCC on the service appliance looks up a VDC-IP that is mapped to a particular slot number and/or VDC ID within the connection data (e.g., using a database, a service table, and/or or other memory). In order to support multiple VDCs, the RISE control VLAN switch virtual interface (SVI) address (or any other similar address) must be unique across different VDCs. In general the SVI address is a logical Layer 3 interface, which can be provided an IP address and used for transmitting and/or receiving packets, other protocol or address types may be applies in a similar way. The following exemplary deployments are supported in this architecture:
  1. One VDC connects to one service appliance (e.g., a RISE enabled service appliance) (e.g., VDC 102 as connected to service appliance 24c in FIG. 8);
  2. One VDC connects to two or more service appliances that are RISE enabled (e.g., VDC 100 as connected to service appliances 24a and 24b in FIG. 8); and/or
  3. Multiple VDCs connect to a same service appliance (e.g., as illustrated in FIG. 10).

Figure 9:
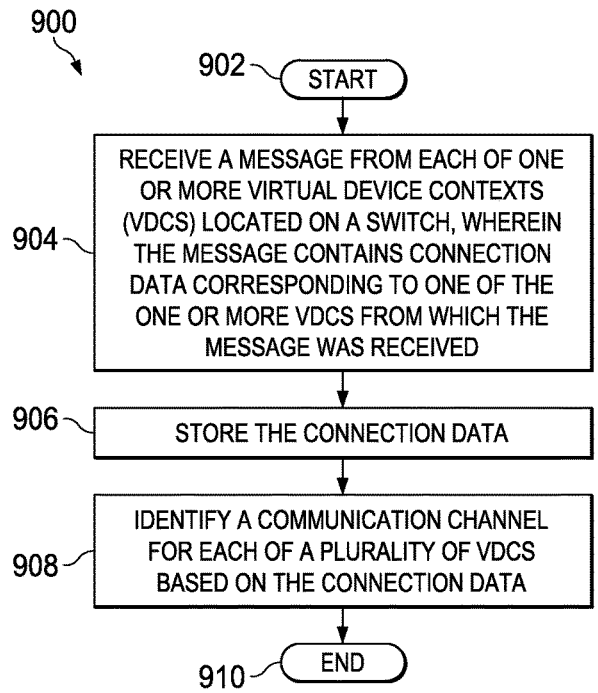
FIG. 9 illustrates an exemplary logic (logic 900) for a service appliance according to an embodiment of the present disclosure.

Turning to FIG. 9, FIG. 9 illustrates an exemplary logic (logic 900) for a service appliance according to an embodiment of the present disclosure. Logic 900 begins at 902 and advances to 904 where the service appliance receives a message from each of one or more virtual device contexts (VDCs) located on a switch, wherein the message contains connection data corresponding to one of the one or more VDCs from which the message was received (i.e., the source VDC). The message may be a discovery message (or boot strap message) transmitted from the source VDC to an ISCC on the service appliance. When the switch is coupled to the service appliance, each VDC may automatically (e.g., without any additional user input other than the coupling) generate the corresponding messages (i.e., including the connection data). Each of the one or more VDCs may transmit corresponding connection data to the service appliance and, thereby, provide information needed by the service appliance to transmit control messages to the VDCs. The connection data can include, e.g., a VDC ID, a VDC name, an address, and/or a service slot number that identifies at least one communication channel between the service appliance and the source VDC. Since each VDC on the switch can communicate the connection data to the service appliance, the switch and the service appliance can advantageously establish communication channels without manual configuration. In addition, this automated communication mechanism enables one or more service appliances to discover, create, and identify connections with one or more VDCs. Logic 900 advances to 906, where the connection data is stored (e.g., by the service appliance). The connection data may be stored in a service table, a database, or any other memory element.

At 908, the service appliance identifies a communication channel for each of a plurality of VDCs based on the connection data. Since the connection data comprises data received from multiple VDCs, when transmitting control data, the service appliance must identify from the connection data a particular connection to a VDC. In some examples, identifying the communication channel for each of a plurality of VDCs may comprise identifying, from the connection data, a first VDC-IP for a first VDC and a second VDC-IP for a second VDC. The service appliance (or ISCC) may identify the first VDC-IP by querying a service table containing the connection data. The query may contain a VDC ID corresponding to the first VDC. In addition to the VDC ID, the query may contain a slot number (e.g., corresponding to a particular service). A result of the query may be a service table entry (or any database record) that corresponds to the information contained in the query. For example, in the example of FIG. 8, the service appliance 24*a* may generate a query comprising VDC ID being "1" (which corresponds the VDC 100) and slot number being "800". Upon submitting a query to a service table, the service appliance may retrieve a service table entry corresponding to the communication channel 26*a*. The service table entry may include among other things the VDC ID, the VDC slot number and an address (e.g., IP address such as a VDC IP, or any other identifier that identifies a network connection) corresponding to the communication channel 26*a*. The service appliance may identify the address from the service table entry. The service appliance (or ISCC) may identify the second VDC-IP using operations similar to those described for the first VDC-IP. In some examples, the service appliance establishes a connection to each of the plurality of VDCs using the communication channel (e.g., based on the VDC-IP) for each of the plurality of VDCs. Establishing the connection may comprise the service appliance opening a connection (e.g., creating an instance of an IP connection). The service appliance may transmit a message to each of the plurality of VDCs using the communication channel for each of the plurality of VDCs. For example, the connection may be utilized to transmit control messages from the service appliance to each of the plurality of VDCs using the corresponding communication channels. Subsequent to identifying the communication channel, the logic 900 ends at 910.

Logic 900 advantageously enables (remote) service appliances to connect to (and/or identify) one or more VDCs within a switch. Thus, a service appliance may have visibility of a plurality of VDCs on a switch to which it is connected (rather than only one VDC on the switch) based on automated communication mechanisms (e.g., bootstrap messages transmitted based on detecting coupling of a switch and a service appliance, wherein the message is generated and/or transmitted without any user input subsequent to the coupling). Logic 900 may be implemented and/or executed by any service appliance, ISCM, or agent described herein (e.g., including but not limited to service appliance 24 and/or ISCC 30 (FIG. 1A-B, and 2), agent 300 (FIG. 3), service appliance 402 and/or ISCC/AGENT 422 (FIG. 4), agent 604 (FIG. 6), any one or more of service appliances 24*a-c* (FIG. 8), service appliance 24*d* (FIG. 10), and/or service appliance 1102 (FIG. 11)).

In some examples, the logic 900 may be encoded in one or more non-transitory tangible media comprising code for execution (e.g., by one or more processors), and when executed by one or more processors performs operations including, at least those described with respect to 902, 904, 906, 908, and 910.

Turning to FIG. 10, FIG. 10 is a simplified block diagram showing additional details of system 10. Service appliance 24*s* may establish RISE communication channels to multiple VDCs 100 and 102. Only two VDCs are illustrated in FIG. 10; however, any number of VDCs may communicate with service appliance 24 without departing from the broad scope of the present disclosure. Each of VDCs 100-102 may be a virtual context within a single physical switch (e.g., switch 22). VDC1 100 may be provisioned with ISCM 28*a* and VDC2 102 may be provisioned with ISCM 28*b*. ISCC 30 is provisioned in service appliance 24*d*. Each ISCM 28*a-d* may pass respective VDC identifications (e.g., VDC ID such as VDC1, VDC2, etc.) so that ISCC 30 knows where to send the return messages.

In FIG. 10, switch 22 includes a global ISCM (GISCM) 32 located in a default VDC 104. The GISCM forms part of the Remote Integrated Service Engine (RISE) element with the one or more ISCMs. The GISCM can access each of the VDCs that reside on a same switch as the GISCM and, thereby, can generate an overview of one or more (e.g., all) of the VDCs on the same switch. In some implementations, the GISCM is to, among other things, provide access to a status of RISE services in all VDC local instances (i.e., local to a switch). The global ISCM (GISCM) may comprise hardware and/or software for communicating with (transmitting messages to and receiving messages from) each of a plurality of VDCs in a switch. In an embodiment, a CLI and/or graphical user interface for an administrator may utilize the GISCM to generate a view of the status of RISE services in all VDC local instances (e.g., VDC 100 and 102). The GISCM (switch global administrator) and ISCM (VDC local administrator) have different levels of access to switch components. An ISCM receives information regarding a service appliance to which it is attached. The information may include for example: software version, hardware version, product serial number, and/or hardware specifications (e.g., CPU, memory, etc.). In one example, an ISCC on the service appliance may send the information to the ISCM on the VDC when the service appliance is discovered or bootstrapped (e.g., by the VDC). Thus, each ISCM may have this information for each of the service appliances to which it is attached. In contrast to an ISCM, which may access a single VDC on which it resides (e.g., VDC), the GISCM may access (e.g., send messages to, receive messages from, poll, direct the actions of, or otherwise communicate with) multiple VDCs on a switch (i.e., the switch on which the GISCM resides) by utilizing the corresponding ISCMs for the multiple VDCs. Because the GISCM can access each of the ISCMs on a switch, the GISCM can access all the service appliances (and/or data associated therewith) attached to the switch by polling each ISCM (e.g., to retrieve information associated with each service appliance). In an embodiment, the information retrieved may include one or more of: software version, hardware version, product serial number, and/or hardware specifications (e.g., CPU, memory, etc.) The GISCM can aggregate (e.g., collate) the information (e.g., for generating a graphical representation of the data for presentation to a user).

The GISCM (e.g., GISCM 32) provides features such as polling the individual ISCMs and/or aggregating data from one or more ISCM to provide a global view of a switch (e.g., at one or more levels of abstraction). Using such features, a service appliance (and/or service) can, e.g., retrieve information about VDC resources and capabilities. In one example, the GISCM transmits a command (e.g., a "show-Module" command) to an ISCM to poll data from the ISCM. Such a command may be transmitted to each of a plurality of ISCMs on a switch. When each ISCM receives the command, it may generate and transmit, to the GISCM, a response comprising any one or more of: software version, hardware version, product serial number, and/or hardware specifications. Finally, the GISCM may aggregate the responses (and/or data therein) from each ISCM to provide a global view of a switch. In operation, such a process of polling and/or aggregating may be utilized for trouble shooting a switch and/or any logical or physical components coupled thereto. For example, the process may be used to determine which software version a service appliance is running. The version may be compared to an expected software version (e.g., based on other service appliances coupled to a service or VDC) to determine whether the versions match or are mismatched. In other cases, the software version may be compared to a list of supported (and/or unsupported) software versions to verify compatibility (or non-compatibility). In other examples, the process may be utilized to determine hardware specifications of a service appliance. For example, the amount of available memory in a service appliance may be compared to an amount of required memory for a service to determine whether the service appliance can support the service. This information may be used to troubleshoot the service appliance when errors are detected. The service appliance may utilize the GISCM to determine, e.g., whether it is running out of memory and/or whether a VDC to which it is connected is running out of memory. Advantageously, this global view allows a service appliance (and/or service) to make intelligent load balancing decisions based on VDC information. In other examples, the service appliance may also determine which of a plurality of VDCs with which to connect (e.g., selecting a VDC that has available CPU capacity for handling an estimated amount of traffic to be sent over the connection).

In a broad sense, a GISCM (e.g., GISCM 32 in VDC 104 (FIG. 4) and/or a GISCM in Default VDC 1112 (FIG. 11)) can access each of multiple levels of abstraction of the switch. For example, the switch may have several levels of abstraction including a VDC level (1): a switch may comprise one or more VDCs, a service appliance level (2): each VDC may be connected to one or more service appliances, and a service level (3): each service appliance may support one or more services. The levels may be arranged in a hierarchy to match the relationship (physical and/or logical relationship/connections) between VDCs, service appliances, and services. The GISCM may traverse the hierarchy of the levels to reach a specific level. For example, the GISCM may use the ISCM to access level a VDC at (1). After reaching level (1), the GISCM may utilize the VDC to access a service appliance at level (2). After reaching level (2), the GISCM may utilize the service appliance to access a service at level (3). In this example, the GISCM traverses down the hierarchy (i.e., from a broad level (i.e., level 1) to a more specific level (i.e., level 3). The GISCM is not limited to such a traversal. The GISCM may traverse up the hierarchy and/or may alternate between moving up and down at various levels of the hierarchy. Because the levels are hierarchically organized, the GISCM is able to: correlate VDCs to service appliances and/or services, or correlate service appliances to VDCs and/or services and to aggregate data based on the correlations. The GISCM on the switch may transmit the correlations or data associated therewith (e.g., unprocessed data, aggregated data, etc.) to any one or more of: a VDC on the switch, a service appliance coupled to the switch, and/or a service supported by the switch. In operation, a service appliance can connect to multiple VDCs and maintain an m:n mapping between service appliances and VDCs (e.g., based on the correlations and/or the connection data). In some examples, the service appliance may maintain a mapping between one or more service appliances and one or more VDCs. In further examples, the service appliance may maintain the mapping to only include a subset of the one or more service appliances (e.g., the subset may only include service appliances that are connected to a common VDC with a given service appliance). For example, a service appliance uses itself as the given service appliance, the service appliance can maintain the mapping to include other service appliances that are connected to a VDC (or multiple VDCs) to which it is connected. As an illustration of this, turning to FIG. 8, service appliance 24a may have a mapping between itself and VDC 100. Using the systems disclosed herein, the service appliance 24a can update the mapping by detecting other service appliances that are also connected to VDC 100 (i.e., a common VDC). In this example, the service appliance 24a can detect (e.g., using the GISCM in FIG. 8) that service appliance 24b is also connected to VDC 100 and update the mapping to include a correspondence (or mapping) between 24b and VDC 100. Because service appliance 24a may also be connected to other VDCs, the mapping may be similarly updated for the other VDCs to create a many-to-many mapping between VDCs and service appliances.

Figure 11:
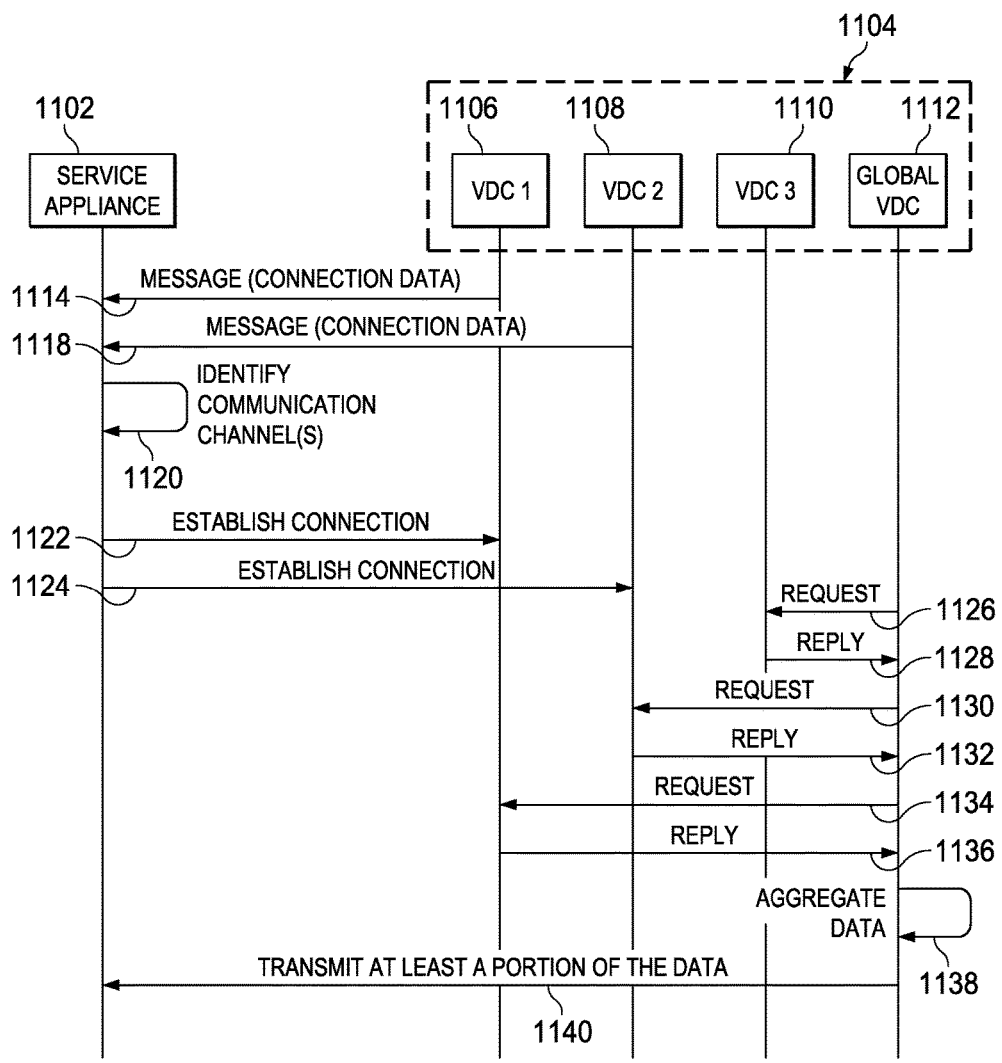
FIG. 11 is another simplified messaging diagram according to an embodiment of the present disclosure.

Turning to FIG. 11, FIG. 11 is another simplified messaging diagram according to an embodiment of the present disclosure. The diagram includes a service appliance 1102 and a switch 1104. The switch 1104 comprises VDC 606 ("VDC 1" or a first VDC), VDC 1108 ("VDC 2" or a second VDC), VDC 1110 ("VDC 3" or a third VDC), and VDC 1112 (a Default VDC). In the example of FIG. 11, service appliance 1102 includes components similar to those in service appliances 24a-d (FIGS. 8 and 10) and may implement logic 900 (FIG. 9). Default VDC 1112 (FIG. 11) includes components similar to those in Default VDC 104 (FIGS. 8 and 10). A difference between the figures is that FIG. 11 depicts three VDCs while FIGS. 8 and 10 depict two VDC. The third VDC (FIG. 11) operates in a manner similar to that described with respect to VDC 100 and 102 (FIGS. 8 and 10). The messaging diagram as shown in FIG. 11 illustrates exemplary messages that may be transmitted between corresponding devices in FIGS. 8 and 10 (also including an additional VDC, i.e., the third VDC).

Each of the virtual device contexts (VDCs) (i.e., 1106, 1108, and/or 1110) located on the switch 1102 may transmit a message to the service appliance 1102. The service appliance 1102 may receive the message from each of the VDCs located on switch 1102. The message contains connection data corresponding to the VDCs from which the message was received. For example, the VDC 1106 transmits message 1114 to service appliance 1102. Service appliance 1102 receives the message 1114 from VDC 1106. The message 1114 contains connection data that identifies a connection between the VDC 1106 and the service appliance 1102. Similarly, the VDC 1108 transmits message 1118 to service appliance 1102. Service appliance 1102 receives the message 1118 from VDC 1108. The message 1118 contains connection data that identifies a connection between the VDC 1108 and the service appliance 1102. Service appliance 1102 may store the connection data received in each of messages 1114 and 1118 in a memory accessible to the service appliance. Although the VDC 1110 is located on the switch 1104, the service appliance 1102 has not received a message from the VDC 1110. This third VDC (i.e., VDC 1110) may correspond to a VDC that is connected to another service appliance (not shown) and is not connected to service appliance 1102.

In some examples the messages (e.g., messages 1114 and 1118) are generated (and/or transmitted) based on detecting that the switch 1104 is coupled to service appliance 1102. The switch 1104 may detect the coupling and transmits an indication of the coupling to each VDC on the switch. For example, the messages may be discovery messages transmitted by the VDCs. In other examples, the messages are generated based on detecting (e.g., by a VDC) that a new service has been created on the VDC. When it is detected that the new service has been created on the VDC, the VDC may identify a particular service appliance (e.g., from a plurality of service appliances to which the VDC is connected) that supports the service. The VDC may transmit, to the particular service appliance, the message (e.g., a boot strap message) including the connection data and, thereby, setup a communication channel to support the new service.

The service appliance 1102 uses the connection data to communicate with a plurality of VDCs. For example, at 1120, service appliance 1102 identifies one or more communication channels. The communication channels are channels that are established between the service appliance and the plurality of VDCs. Identifiers corresponding to the communication channels may be stored in the connection data. In some examples, the service appliance 1102 identifies communication channels by using at least a portion of logic 900 (FIG. 9). In this example, the service appliance 1102 identifies a first communication channel between the service appliance 1102 and VDC 1106 based on the connection data stored in the memory. In addition, the service appliance 1102 identifies a second communication channel between the service appliance 1102 and VDC 1108 based on the connection data stored in the memory. The service appliance 1102 utilizes the identified communication channels to establish connections with the BBC's. The service appliance 1102 opens a connection 1122 (e.g., an IP connection, a TPC connection, or another type of connection) to VDC 1106 and opens a connection 1124 (e.g., an IP connection, a TPC connection, or another type of connection) to VDC 1108. The service appliance does not establish direct a connection to the VDC 1110 due, at least in part, to a lack of connection data required to connect to the VDC 1110 (e.g., because no message was received from VDC 1110 including connection data). The service appliance 1102 may transmit control messages using the connections over the communication channels. For example, the service appliance 1102 may transmit control messages to VDC 1106 using the connection 1122 over the first communication channel and/or may transmit control messages to VDC 1108 using the connection 1124 over the second communication channel.

The default VDC 1112 can access all of the VDCs on the switch 1104. For example, the default VDC 1112 can request data from each of the VDCs and can receive a reply comprising at least a portion of the requested data from each VDC. The default VDC 1112 generates request 1126 and transmits the request to VDC 1110. The VDC 1110 generates and transmits (e.g., based on and/or in response to request 1126) reply 1128 to the default VDC 1112. The default VDC 1112 generates request 1130 and transmits the request to VDC 1108. The VDC 1108 generates and transmits (e.g., based on and/or in response to request 1130) reply 1132 to the default VDC 1112. The default VDC 1112 generates request 1134 and transmits the request to VDC 1106. The VDC 1106 generates and transmits (e.g., based on and/or in response to request 1134) reply 1136 to the default VDC 1112. In some examples, the requests identify particular data that is requested from the VDC (e.g., software version, hardware version, product serial number, hardware specifications (e.g., CPU, memory, etc.), VLAN membership, policies, settings on the VDC, and the like). In other examples, the request is a generic request for all information available regarding a VDC to which the request is transmitted. In some cases, the default VDC 1112 may only submit a request to an individual VDC on the switch (e.g., to generate data regarding the performance of the VDC). In other cases, the default VDC 1112 may submit a request to more than one VDC on the switch (e.g., only a subset of VDCs that are connected to one or more service appliances). In still other cases, the default VDC 1112 submits a request to more than all VDCs on the switch (e.g., to generate data regarding the performance of the switch based on all of the VDCs).

When the default VDC 1112 receives the replies (e.g. replies 1128, 1132, and 1136), the default VDC 1112 aggregates the data (at 1138) received in each of the replies. The aggregation may comprise summing similar types of data received from the respective VDCs (e.g., to provide summary statistics between the polled VDCs, such as collective memory capacity, collective available bandwidth, and the like). The aggregation may comprise analyzing (either individually or collectively) the data received from each of the VDCs. At 1140, the default VDC 1112 transmits at least a portion of the data (i.e., the data received in the replies) to the service appliance 1102. The data transmitted at 1140 may include the data from only a single reply or data aggregated from a plurality of replies. For example, the data transmitted at 1140 may include data regarding only one of VDCs 1106, 1108, and 1110. Alternatively, the data transmitted at 1140 may include data regarding each of VDCs 1106, 1108, and 1110 to the service appliance 1102. In such an example, the data transmitted to the service appliance 1102 can also include data regarding a VDC to which the service appliance is not connected (e.g., VDC 1110 which is not directly connected to service appliance 1102).

A GISCM offers many advantages over a traditional system. Using a GISCM, a service appliance advantageously gains visibility into Virtual Device Contexts (VDCs) to which they are connected. In addition, the service appliances may utilize the GISCM to determine the type of traffic that the VDCs are servicing. This may require aggregating data for a plurality of service appliances that are connected to the VDC to which a particular service appliance is connected. In traditional systems, a service appliance may only know about its own connection to a VDC and therefore fails to allow such global aggregation and provision to a particular service appliance. Such features allow a service appliance to specify a policy (or VDC configuration) that is enforced (at least in part, by using the GISCM) on the VDCs to which they are connected. Traditional systems fail to support such features at least because they lack a GISCM as disclosed herein, e.g., to provide a global view.

Using the systems and methods described herein, a service appliance (and/or agent) can detect inconsistent configuration across multiple VDCs. If a service appliance (that supports a service) connects to multiple VDCs on the same switch, both a RISE SDK process on the service appliance and software processes that are specific to the service can access or "view" a configuration for one or more of the multiple VDCs (e.g., by using a GISCM). Accessing the configuration allows the service appliance to identify (and/or resolve) an inconsistency between policies on different VDCs. Such features allow a service appliance to specify a policy (or VDC configuration) that is enforced on the VDCs to which they are connected and to detect whether the policy is met by the VDC. Each service appliance may apply one or more policies to a VDC (VDC policies) to which it is connected. Because a VDC may be connected to multiple service appliances, potential problems may arise, e.g., when the service appliances apply, to the VDC, policies that are inconsistent with one another (e.g., two policies that the VDC cannot mutually satisfy). The problem of VDC policies that result in inconsistent configuration can be solved, at least in part, by using a GISCM to detected (and/or resolve) the problem since the service appliance has visibility into VDCs.

Examples of inconsistent configurations include (but are not limited to) any of: a setting on a VDC that has been assigned a value by more than one endpoint; a setting on a VDC that has been assigned a value that violates a rule that is implemented by (or otherwise associated with) the VDC; receipt of value for a setting (e.g., prior to applying the setting) on a VDC, where the value would violates a rule. For example, a VDC policy (i.e., an exemplary rule) may specify that VLANs on a communication channel connecting a service appliance to a first VDC cannot overlap with VLANS on the communication channel connecting the service appliance to second VDC (e.g., the list VLAN members of for each of the VDCs must be mutually exclusive from one another and/or cannot not have any VLAN member that is contained in both). In this scenario, the service appliance can detect the misconfiguration. For example, the service appliance can request (from a GISCM) VLAN membership for communication channels to each of the first and the second VDCs. The GISCM may generate requests and transmit the requests (e.g., requests 1126, 1130, and 1134) for VLAN member data from one or more VDCs based on the request from the service appliance. The GISCM may receive replies (e.g., replies 1128, 1132, and 1136) to the requests from each of the VDCs. In some cases, the GISCM requests data from VDCs that are not connected to the service appliance and, thereby, enables the service appliance to access data regarding VDCs to which it is not directly connected. The GISCM may aggregate the data (e.g., at 1138). When the VLAN membership is transmitted from the GISCM to the service appliance (e.g. at 1140), the service appliance can compare the membership of each of the first and the second VDCs to identify any matching members (overlaps) between the two). Upon detection (e.g., if an overlap is detected), the service appliance can send failure messages to the switch (e.g., by sending messages from the ISCC to the ISCM and/or GISCM) indicating the misconfiguration. The GISCM (and or an administrator accessing the GISCM) can use this information (i.e., the messages indicating the misconfiguration) for recovery and debugging purposes.

In certain other appliances, a policy may specify that a fixed number of service appliance ports can be shared across VDCs. The service appliance can detect whether the fixed number of shared ports has been reached. In addition, these shared service appliance ports can be configured by different VDCs. However, one VDC may not know if a particular service appliance port has been configured in another VDC. If one service appliance is connected to both VDCs, the service appliance can detect whether the configuration of ports is overlapping across the VDCs. For example, if there are 4 ports (e.g., ports 1, 2, 3, and 4) and both VDCs have a configuration specifying a connection to ports 1 and 2, then ports 1 and 2 constitute an overlapping configuration between the two VDCs. However, only one VDC can own these ports. In this case, the configuration of ports 1 and 2 does not match the physical wiring, which could result in resulting in packets being sent to the wrong VDC. The service appliance can detect such an overlapping configuration based on accessing (e.g., from the GISCM) and comparing a configuration for the VDCs. For example, a service appliance (e.g., service appliance 1102) can request, from a GISCM on the default VDC (e.g., default VDC 1112), a mapping of service appliance ports to VDCs. Based on a request from the service appliance, the GISCM may generate requests (e.g., requests 1126, 1130, and 1134) for service appliance ports to a plurality of VDCs on the switch. Each of the VDCs may generate and transmit replies (e.g., replies 1128, 1132, and 1136) identifying the service appliance ports to which they are connected. The default VDC may aggregate the data (e.g., at 1138) received in the replies by generating a mapping that maps service appliance ports to the VDCs from which they were received. The default VDC may transmit the mapping (e.g., at 1140) to the service appliance. The service appliance may receive the mapping from the default VDC. The mapping is received, the service appliance can compare the mapping and identify (based on the comparison) that ports 1 and 2 are configured for connection two the two VDCs (i.e., detects an inconsistency based on the policy that specifies the fixed number of shared service appliance ports).

In the above examples, the service appliance detects and/or resolves the inconsistencies. In other embodiments, the Global ISCM can also be used to detect the inconsistent configuration by polling the individual ISCMs for their configuration. In further examples, the service appliance work in combination with the GISCM (e.g., the service appliance instructs the GISCM, or vice versa) to detect and/or resolve the inconsistent configurations.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, provisioned in service appliance 24 and/or switch 22 (e.g., through various modules, algorithms, processes, etc.). One example is the agent as described herein. In some embodiments, one or more of these features may be implemented in hardware, provided external to these elements, or consolidated in any appropriate manner to achieve the intended functionality. Service appliance 24 and/or switch 22 may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, switch 22 and service appliance 24 described and shown herein (and/or their associated structures) may also include suitable interfaces for receiving, transmitting, and/or otherwise communicating data or information in a network environment. Additionally, some of the processors and memories associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memories (e.g., memory 92, memory 88) can store data used for the operations described herein. This includes the memory being able to store instructions (e.g., as part of logic, software, code, etc.) that are executed to carry out the activities described in this Specification. A processor can execute any type of instructions associated with the data to achieve the operations detailed herein in this Specification. In one example, processors 86 and processor 90 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, components in system 10 can include one or more memory elements (e.g., memory 88, memory 92) for storing information to be used in achieving operations as outlined herein. These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, formatting, and protocols, system 10 may be applicable to other exchanges, formats, or routing protocols. Moreover, although system 10 has been illustrated with reference to particular elements and operations that facilitate the communication process, these elements, and operations may be replaced by any suitable architecture or process that achieves the intended functionality of system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims (if any) or examples. In order to assist the United States Patent and Trademark Office (USPTO) and, additionally, any readers of any patent issued on this application in interpreting the claims or examples appended hereto (if any), Applicant wishes to note that the Applicant: (a) does not intend any of the appended claims or examples (if any) to invoke paragraph six (6) of 35 U.S.C. section 112 as it exists on the date of the filing hereof unless the words "means for" or "step for" are specifically used in the particular claims or examples (if any); and (b) does not intend, by any statement in the specification, to limit this disclosure in any way that is not otherwise reflected in the appended claims.

The following examples pertain to some embodiments of the disclosure.

Example 1 is a method for implementing an agent for a service appliance, the method comprising: intercepting a message received from a switch; and determining an end point for the message based on the opcode of the message, a channel from which the message was received, an entry in a service table corresponding to a service associated with the message, wherein the end point is the agent or a component of the service appliance.

In Example 2, the subject matter of Example 1 can optionally include wherein the end point includes any one of: service channel, discovery channel, application channel.

Example 3 is a method for implementing an agent for a service appliance, the method comprising: intercepting a message on the service appliance; determining a message type definition corresponding to the message; constructing the message based on the corresponding message type definition; and transmitting the message to the ISCM or application (and optionally encrypting the message prior to the transmitting the message).

In Example 4, the subject matter of Example 3 can optionally include the constructing the message comprising using a TLV operation API.

Example 5 is a method for implementing an agent for a service appliance, the method comprising: intercepting a message on the service appliance; determining a message type definition corresponding to the message; de-constructing the message based on the corresponding message type definition; and transmitting the message to the ISCC (and optionally decrypting the message prior to transmitting the message).

In Example 6, the subject matter of Example 5 can optionally include: wherein the de-constructing the message comprises using a de-TLV operation API to parse the message received from the ISCM.

Example 7 is an apparatus for implementing an agent for a service appliance, the apparatus comprising: at least one memory element; at least one processor coupled to the at least one memory element; and an agent that when executed by the at least one processor is configured to perform the method of any of Examples 1-6.

In Example 8, the subject matter of Example 7 can optionally include: wherein the agent is provided as a binary code package on the service appliance.

Example 9 is a computer-readable non-transitory medium comprising one or more instructions, for implementing agent for a service appliance, that when executed on a processor configures the processor to perform one or more operations corresponding to the method of any of Examples 1-6.

Example 10 is a method comprising intercepting, by an agent on a service appliance, a message received from a switch; and determining a destination for the message based on an opcode of the message, a channel from which the message was received, and an entry in a service table corresponding to a service associated with the message.

In Example 11, the subject matter of Example 10 can optionally include the channel from which the message was received being a first channel, the first channel connecting the service appliance to the switch, and further comprising: determining, from a plurality of types of channel, a type of channel over which to transmit the message based on the opcode of the message, the channel from which the message was received, and the entry in the service table.

In Example 12, the subject matter of Example 10 or 11 can optionally include identifying a second channel based on the type of channel and an identifier corresponding to the service associated with the message; and transmitting at least a portion of the message over the second channel.

In Example 13, the subject matter of any of Examples 10-12 can optionally include the destination being the agent or a component of the service appliance, and wherein the destination includes at least one of: a service channel, a discovery channel, and an application channel.

In Example 14, the subject matter of any of Examples 10-13 can optionally include determining a message type definition corresponding to the message, wherein the message type definition defines a messaging structure used in communications between the switch and the service appliance; constructing the message based on the message type definition; and transmitting the message to a component on the switch or a component on the service appliance.

In Example 15, the subject matter of any of Examples 10-14 can optionally include determine a message type definition corresponding to the message, wherein the message type definition defines a messaging structure used in communications between the switch and the service appliance; deconstructing the message based on the message type definition; and transmitting the message to the a component on the service appliance.

In Example 16, the subject matter of any of Examples 10-15 can optionally include the message type definition comprising one or more TLV operation APIs that when executed by a processor are operable to encode a payload of the message or decode a payload of the message.

Example 17 is an agent comprising: a memory element configured to store electronic code, a processor operable to execute instructions associated with the electronic code, and a service module coupled to the processor and the memory element, wherein when the service module is executed performs operations comprising: intercepting, by the agent, a message received from a switch, wherein the agent is located on a service appliance; and determining a destination for the message based on an opcode of the message, a channel from which the message was received, and an entry in a service table corresponding to a service associated with the message.

In Example 18, the subject matter of Example 17 can optionally include the channel from which the message was received being a first channel, the first channel connecting the service appliance to the switch, and the operations further comprise: determining, from a plurality of types of channel, a type of channel over which to transmit the message based on the opcode of the message, the channel from which the message was received, and the entry in the service table.

In Example 19, the subject matter of Example 17 or 18 can optionally include the operations further comprising identifying a second channel based on the type of channel and an identifier corresponding to the service associated with the message; and transmitting at least a portion of the message over the second channel.

In Example 20, the subject matter of any of Examples 17-19 can optionally include the destination being the agent or a component of the service appliance, and wherein the destination includes at least one of: a service channel, a discovery channel, and an application channel.

In Example 21, the subject matter of any of Examples 17-20 can optionally include the operations further comprising: determining a message type definition corresponding to the message, wherein the message type definition defines a messaging structure used in communications between the switch and the service appliance; constructing the message based on the message type definition; and transmitting the message to a component on the switch or a component on the service appliance.

In Example 22, the subject matter of any of Examples 17-21 can optionally include the operations further comprising determining a message type definition corresponding to the message, wherein the message type definition defines a messaging structure used in communications between the switch and the service appliance; deconstructing the message based on the message type definition; and transmitting the message to the a component on the service appliance.

In Example 23, the subject matter of any of Examples 17-22 can optionally include the message type definition comprising one or more TLV operation APIs that when executed by a processor are operable to encode a payload of the message or decode a payload of the message.

Example 24 is one or more non-transitory media that includes code for execution and when executed by one or more processors performs operations comprising: intercepting, by an agent on a service appliance, a message received from a switch; and determining a destination for the message based on an opcode of the message, a channel from which the message was received, and an entry in a service table corresponding to a service associated with the message.

In Example 25, the subject matter of Example 24 can optionally include the channel from which the message was received being a first channel, the first channel connecting the service appliance to the switch, and further comprising: determining, from a plurality of types of channel, a type of channel over which to transmit the message based on the opcode of the message, the channel from which the message was received, and the entry in the service table.

In Example 26, the subject matter of Example 24 or 25 can optionally include identifying a second channel based on the type of channel and an identifier corresponding to the service associated with the message; and transmitting at least a portion of the message over the second channel.

In Example 27, the subject matter of any of Examples 24-26 can optionally include the destination being the agent or a component of the service appliance, and wherein the destination includes at least one of: a service channel, a discovery channel, and an application channel.

In Example 28, the subject matter of any of Examples 24-27 can optionally include determining a message type definition corresponding to the message, wherein the message type definition defines a messaging structure used in communications between the switch and the service appliance; constructing the message based on the message type definition; and transmitting the message to a component on the switch or a component on the service appliance.

In Example 29, the subject matter of any of Examples 24-28 can optionally include determining a message type definition corresponding to the message, wherein the message type definition defines a messaging structure used in communications between the switch and the service appliance; deconstructing the message based on the message type definition; and transmitting the message to the a component on the service appliance.

In Example 30, the subject matter of any of Examples 24-39 can optionally include the message type definition comprising one or more TLV operation APIs that when executed by a processor are operable to encode a payload of the message or decode a payload of the message.

Example 31 is method for communicating between service appliances and Virtual Device Contexts (VDCs), the method comprising establishing one or more communication channels between a switch, comprising one or more VDCs, and one or more service appliances; receiving a VDC identifier (VDC ID) and a service slot number corresponding to a service; and determining an address for one of the one or more communication channels based on the VDC identifier (VDC ID) and the service slot number.

In Example 32, the subject matter of Example 31 can optionally include the VDC identifier (VDC ID) and the service slot number being received from ISCM in the one or more VDCs.

In Example 33, the subject matter of Example 31 can optionally include transmitting, using the address, a message over the one of the one or more communication channels.

In Example 34, the subject matter of Example 33 can optionally include the message being transmitted to a VDC of one or more VDCs, and wherein the VDC corresponds to the VDC ID.

In Example 35, the subject matter of Example 31 can optionally include the switch having a set of available service slots and a corresponding set of service slot numbers; and each of the one or more VDCs having been assigned a different subset of the corresponding set of service slot numbers.

In Example 36, the subject matter of Example 31 can optionally include accessing a mapping between the one or more service appliances and the one or more VDCs.

In Example 37, the subject matter of Example 31 can optionally include the mapping only including a subset of the one or more service appliances, the subset only including service appliances that are connected to a common VDC with a given service appliance.

Example 38 is a method for communicating between service appliances and Virtual Device Contexts (VDCs), the method comprising: establishing one or more communication channels between a switch, comprising one or more VDCs, and one or more service appliances; and transmitting, to a service appliance, a VDC identifier (VDC ID) and a service slot number corresponding to a service.

In Example 39, the subject matter of Example 38 can optionally include the switch having a set of service available slots and a corresponding set of service slot numbers; and each of the one or more VDCs have been assigned a different subset of the corresponding set of service slot numbers.

Example 40 is a method for proving global information associated with Virtual Device Contexts (VDCs), the method comprising: generating a message to poll each of a plurality of VDCs on a switch; receiving data from each of the plurality of VDCs on the switch based on the message; and aggregating the received data.

In Example 41, the subject matter of Example 40 can optionally include detecting an inconsistent configuration and/or inconsistent policy based on the aggregated data.

In Example 42, the subject matter of Example 40 can optionally include transmitting the aggregated data a service appliance, wherein the service appliance is to use the aggregated data for detecting an inconsistent configuration and/or inconstant policy based on the aggregated data.

In Example 43, the subject matter of Example 40 can optionally include the message being a request to access one of multiple levels of abstraction of the switch.

In Example 44, the subject matter of Example 40 can optionally include wherein multiple levels of abstraction of the switch comprises: a level corresponding to the plurality of VDCs on the switch, a level corresponding to one or more service appliances coupled to each of the plurality of VDCs on the switch, a level corresponding to one or more services supported by each of the one or more service appliances, and/or any combination thereof.

In Example 45, the subject matter of Example 40 can optionally include the switch including one or more intelligent service card manager module (ISCM) that forms part of a Remote Integrated Service Engine (RISE) element with a corresponding one or more intelligent service card client module (ISCC) on a service appliance, and wherein the switch includes a global intelligent service card manager module (GISCM) that forms part of the Remote Integrated Service Engine (RISE) element with the one or more ISCMs.

Example 46 is an apparatus for communicating between service appliances and Virtual Device Contexts (VDCs), the apparatus comprising: at least one memory element; at least one processor coupled to the at least one memory element; and a manager module that when executed by the at least one processor is configured to perform the method of any of Examples 31-45.

In Example 47, the subject matter of Example 46 can optionally include the manager module being provided as a binary code package on a service appliance.

In Example 48, the subject matter of Example 46 can optionally include the manager module is provided as a binary code package on a VDC.

Example 49 is a computer-readable non-transitory medium comprising one or more instructions, for implementing a communication mechanism, that when executed on a processor, configures the processor to perform one or more operations corresponding to the method of any of Examples 31-45.

Example 50 is a method comprising: receiving, by a service appliance, a message from each of one or more virtual device contexts (VDCs) located on a switch, wherein the message contains connection data that identifies at least one communication channel between the service appliance and a corresponding one of the one or more VDCs from which the message was received; storing the connection data in a memory accessible to the service appliance; identifying, by the service appliance, a communication channel for each of a plurality of VDCs based on the connection data and an identifier corresponding to each of the plurality of VDCs; and establishing, by the service appliance, a connection to each of the plurality of VDCs using the communication channel for each of the plurality of VDCs.

In Example 51, the subject matter of Example 50 can optionally include transmitting, by the service appliance, a message to each of the plurality of VDCs using the communication channel for each of the plurality of VDCs.

In Example 52, the subject matter of Example 50 or 51 can optionally include the identifying the communication channel for each of the plurality of VDCs based on the connection data and the identifier corresponding to each of the plurality of VDCs comprising: accessing an identifier that identifies a VDC, and a service slot number associated with the VDC; and determining, using the connection data, an address for the communication channel based on the identifier and the service slot number.

In Example 53, the subject matter of any of Examples 50-52 can optionally include the identifier and the service slot number being received from a process running on the one or more VDCs.

In Example 54, the subject matter of any of Examples 50-53 can optionally include the switch having a set of available service slots and a corresponding set of service slot numbers; and each of the one or more VDCs on the switch has been assigned a different subset of the corresponding set of service slot numbers.

In Example 55, the subject matter of any of Examples 50-54 can optionally include receiving data from each of a plurality of VDCs on the switch, wherein the data was generated by transmitting a request to each of the plurality of VDCs on the switch; and aggregating the received data from the each of the plurality of VDCs.

In Example 56, the subject matter of any of Examples 50-55 can optionally include detecting, based on the aggregation of the received data, an inconsistent configuration or an inconsistent policy.

Example 57 is a service appliance comprising: a memory element configured to store electronic code, a processor operable to execute instructions associated with the electronic code, and a service module coupled to the processor and the memory element, wherein when the service module is executed performs operations comprising: receiving a message from each of one or more virtual device contexts (VDCs) located on a switch, wherein the message contains connection data that identifies at least one communication channel between the service appliance and a corresponding one of the one or more VDCs from which the message was received; storing the connection data in a memory accessible to the service appliance; identifying a communication channel for each of a plurality of VDCs based on the connection data and an identifier corresponding to each of the plurality of VDCs; and establishing a connection to each of the plurality of VDCs using the communication channel for each of the plurality of VDCs.

In Example 58, the subject matter of Example 57 can optionally include the operations further comprising transmitting, by the service appliance, a message to each of the plurality of VDCs using the communication channel for each of the plurality of VDCs.

In Example 59, the subject matter of Example 57 or 58 can optionally include the identifying the communication channel for each of the plurality of VDCs based on the connection data and the identifier corresponding to each of the plurality of VDCs comprising: accessing an identifier that identifies a VDC, and a service slot number associated with the VDC; and determining, using the connection data, an address for the communication channel based on the identifier and the service slot number.

In Example 60, the subject matter of any of Examples 57-59 can optionally include the identifier and the service slot number being received from a process running on the one or more VDCs.

In Example 61, the subject matter of any of Examples 57-60 can optionally include the switch having a set of available service slots and a corresponding set of service slot numbers; and each of the one or more VDCs on the switch having been assigned a different subset of the corresponding set of service slot numbers.

In Example 62, the subject matter of any of Examples 57-61 can optionally include the operations further comprising: receiving data from each of a plurality of VDCs on the switch, wherein the data was generated by transmitting a request to each of the plurality of VDCs on the switch; and aggregating the received data from the each of the plurality of VDCs.

In Example 63, the subject matter of any of Examples 57-62 can optionally include the operations further comprising detecting, based on the aggregation of the received data, an inconsistent configuration or an inconsistent policy.

Example 64 is one or more non-transitory media that includes code for execution and when executed by one or more processors performs operations comprising: receiving, by a service appliance, a message from each of one or more virtual device contexts (VDCs) located on a switch, wherein the message contains connection data that identifies at least one communication channel between the service appliance and a corresponding one of the one or more VDCs from which the message was received; storing the connection data in a memory accessible to the service appliance; identifying, by the service appliance, a communication channel for each of a plurality of VDCs based on the connection data and an identifier corresponding to each of the plurality of VDCs; and establishing, by the service appliance, a connection to each of the plurality of VDCs using the communication channel for each of the plurality of VDCs.

In Example 65, the subject matter of Example 64 can optionally include the operations further comprising transmitting, by the service appliance, a message to each of the plurality of VDCs using the communication channel for each of the plurality of VDCs.

In Example 66, the subject matter of Example 64 or 65 can optionally include the identifying the communication channel for each of the plurality of VDCs based on the connection data and the identifier corresponding to each of the plurality of VDCs comprising: accessing an identifier that identifies a VDC, and a service slot number associated with the VDC; and determining, using the connection data, an address for the communication channel based on the identifier and the service slot number.

In Example 67, the subject matter of any of Examples 64-66 can optionally include the identifier and the service slot number being received from a process running on the one or more VDCs.

In Example 68, the subject matter of any of Examples 64-67 can optionally include the switch having a set of available service slots and a corresponding set of service slot numbers; and each of the one or more VDCs on the switch having been assigned a different subset of the corresponding set of service slot numbers.

In Example 69, the subject matter of any of Examples 64-68 can optionally include the operations further comprising: receiving data from each of a plurality of VDCs on the switch, wherein the data was generated by transmitting a request to each of the plurality of VDCs on the switch; and aggregating the received data from the each of the plurality of VDCs.

In Example 70, the subject matter of any of Examples 64-69 can optionally include the operations further comprising detecting, based on the aggregation of the received data, an inconsistent configuration or an inconsistent policy.

What is claimed is:

1. A method comprising:
   receiving, by a service appliance, a message from each of one or more virtual device contexts (VDCs) located on a switch, wherein the message contains connection data that identifies at least one communication channel between the service appliance and a corresponding one of the one or more VDCs from which the message was received;
   storing the connection data in a memory accessible to the service appliance;
   identifying, by the service appliance, a communication channel for each of a plurality of VDCs based on the connection data and an identifier corresponding to each of the plurality of VDCs; and
   establishing, by the service appliance, a connection to each of the plurality of VDCs using the communication channel for each of the plurality of VDCs.

2. The method of claim 1, further comprising transmitting, by the service appliance, a message to each of the plurality of VDCs using the communication channel for each of the plurality of VDCs.

3. The method of claim 1, wherein the identifying the communication channel for each of the plurality of VDCs based on the connection data and the identifier corresponding to each of the plurality of VDCs comprises:
   accessing an identifier that identifies a VDC, and a service slot number associated with the VDC; and
   determining, using the connection data, an address for the communication channel based on the identifier and the service slot number.

4. The method of claim 1, wherein the identifier and the service slot number are received from a process running on the one or more VDCs.

5. The method of claim 1, wherein the switch has a set of available service slots and a corresponding set of service slot numbers; and each of the one or more VDCs on has been assigned a different subset of the corresponding set of service slot numbers.

6. The method of claim 1, further comprising
   receiving data from each of a plurality of VDCs on the switch, wherein the data was generated by transmitting a request to each of the plurality of VDCs on the switch; and
   aggregating the received data from the each of the plurality of VDCs.

7. The method of claim 6, further comprising detecting, based on the aggregation of the received data, an inconsistent configuration or an inconsistent policy.

8. A service appliance comprising:
   a memory element configured to store electronic code,
   a processor operable to execute instructions associated with the electronic code, and
   a service module coupled to the processor and the memory element, wherein when the service module is executed performs operations comprising:
      receiving a message from each of one or more virtual device contexts (VDCs) located on a switch, wherein the message contains connection data that identifies at least one communication channel between the service appliance and a corresponding one of the one or more VDCs from which the message was received;
      storing the connection data in a memory accessible to the service appliance;
      identifying a communication channel for each of a plurality of VDCs based on the connection data and an identifier corresponding to each of the plurality of VDCs; and
      establishing a connection to each of the plurality of VDCs using the communication channel for each of the plurality of VDCs.

9. The service appliance of claim 8, wherein the operations further comprise transmitting, by the service appliance, a message to each of the plurality of VDCs using the communication channel for each of the plurality of VDCs.

10. The service appliance of claim 8, wherein the identifying the communication channel for each of the plurality of VDCs based on the connection data and the identifier corresponding to each of the plurality of VDCs comprises:
    accessing an identifier that identifies a VDC, and a service slot number associated with the VDC; and
    determining, using the connection data, an address for the communication channel based on the identifier and the service slot number.

11. The service appliance of claim 8, wherein the identifier and the service slot number are received from a process running on the one or more VDCs.

12. The service appliance of claim 8, wherein the switch has a set of available service slots and a corresponding set of service slot numbers; and each of the one or more VDCs on has been assigned a different subset of the corresponding set of service slot numbers.

13. The service appliance of claim 8, wherein the operations further comprise:
    receiving data from each of a plurality of VDCs on the switch, wherein the data was generated by transmitting a request to each of the plurality of VDCs on the switch; and
    aggregating the received data from the each of the plurality of VDCs.

14. The service appliance of claim 13, wherein the operations further comprise detecting, based on the aggregation of the received data, an inconsistent configuration or an inconsistent policy.

15. One or more non-transitory media that includes code for execution and when executed by one or more processors performs operations comprising:
    receiving, by a service appliance, a message from each of one or more virtual device contexts (VDCs) located on a switch, wherein the message contains connection data that identifies at least one communication channel between the service appliance and a corresponding one of the one or more VDCs from which the message was received;
    storing the connection data in a memory accessible to the service appliance;
    identifying, by the service appliance, a communication channel for each of a plurality of VDCs based on the connection data and an identifier corresponding to each of the plurality of VDCs; and establishing, by the service appliance, a connection to each of the plurality of VDCs using the communication channel for each of the plurality of VDCs.

16. The one or more non-transitory media of claim 15, wherein the operations further comprise transmitting, by the service appliance, a message to each of the plurality of VDCs using the communication channel for each of the plurality of VDCs.

17. The one or more non-transitory media of claim 15, wherein the identifying the communication channel for each of the plurality of VDCs based on the connection data and the identifier corresponding to each of the plurality of VDCs comprises:

accessing an identifier that identifies a VDC, and a service slot number associated with the VDC; and determining, using the connection data, an address for the communication channel based on the identifier and the service slot number.

18. The one or more non-transitory media of claim 15, wherein the identifier and the service slot number are received from a process running on the one or more VDCs.

19. The one or more non-transitory media of claim 15, wherein the switch has a set of available service slots and a corresponding set of service slot numbers; and each of the one or more VDCs on has been assigned a different subset of the corresponding set of service slot numbers.

20. The one or more non-transitory media of claim 15, wherein the operations further comprise:

receiving data from each of a plurality of VDCs on the switch, wherein the data was generated by transmitting a request to each of the plurality of VDCs on the switch; and aggregating the received data from the each of the plurality of VDCs.

21. The one or more non-transitory media of claim 20, wherein the operations further comprise detecting, based on the aggregation of the received data, an inconsistent configuration or an inconsistent policy.

* * * * *